United States Patent
Patel et al.

(10) Patent No.: US 8,706,755 B2
(45) Date of Patent: *Apr. 22, 2014

(54) DISTRIBUTED FILE SYSTEM FOR INTELLIGENTLY MANAGING THE STORING AND RETRIEVAL OF DATA

(75) Inventors: Sujal M. Patel, Seattle, WA (US); Paul A. Mikesell, Seattle, WA (US); Darren P. Schack, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/728,081

(22) Filed: Mar. 19, 2010

(65) Prior Publication Data
US 2010/0257219 A1  Oct. 7, 2010

Related U.S. Application Data

(63) Continuation of application No. 10/007,003, filed on Nov. 9, 2001, now Pat. No. 7,685,126.

(60) Provisional application No. 60/309,803, filed on Aug. 3, 2001.

(51) Int. Cl.
*G06F 7/00* (2006.01)
*G06F 17/00* (2006.01)
*G06F 17/30* (2006.01)
*G06F 12/00* (2006.01)

(52) U.S. Cl.
USPC ............ 707/770; 707/771; 707/775; 711/113

(58) Field of Classification Search
USPC ....... 711/164, 113; 714/4; 709/223; 707/770, 707/771, 775
See application file for complete search history.

(56) References Cited

U.S. PATENT DOCUMENTS 5,434,994 A * 7/1995 Shaheen et al. ............... 709/223
5,548,724 A   8/1996 Akizawa
(Continued)

FOREIGN PATENT DOCUMENTS

WO  00/57315 A  9/2000
WO  01/33829 A  5/2001

OTHER PUBLICATIONS

Communication from European Patent Office (with partial Search Report), dated Jul. 14, 2011, 8 pages.

(Continued)

*Primary Examiner* — Susan Chen
(74) *Attorney, Agent, or Firm* — Frommer Lawrence & Haug LLP; John W. Branch

(57) ABSTRACT

A distributed file system enables the intelligent storing and retrieval of files among a plurality of storage units. The distributed file system utilizes a metadata data structure to track and manage detailed information about each file, including, for example, the device and block locations of the file's data blocks, to permit different levels of replication and/or redundancy. The distributed file system includes a switch to receive a read request for a file and to send the read request to one of the storage units. Each of the plurality of storage units is operable to monitor access to the file, such that a block cache module is operable to perform a scalable number of packet read aheads, wherein the scalable number is based on at least a current read rate and a current latency of a link to access the at least one file.

20 Claims, 18 Drawing Sheets

(56) References Cited

U.S. PATENT DOCUMENTS

| | | | |
|---|---|---|---|
| 5,596,744 A * | 1/1997 | Dao et al. ............................. | 1/1 |
| 5,884,046 A | 3/1999 | Antonov | |
| 5,884,324 A * | 3/1999 | Cheng et al. ......................... | 1/1 |
| 5,963,963 A * | 10/1999 | Schmuck et al. ..................... | 1/1 |
| 6,032,216 A | 2/2000 | Schmuck et al. | |
| 6,173,374 B1 | 1/2001 | Heil | |
| 6,219,693 B1 | 4/2001 | Napolitano et al. | |
| 7,606,844 B2 * | 10/2009 | Kottomtharayil ..................... | 1/1 |
| 7,685,126 B2 * | 3/2010 | Patel et al. ........................... | 707/770 |
| 2002/0049778 A1 * | 4/2002 | Bell et al. ............................. | 707/200 |
| 2003/0014391 A1 * | 1/2003 | Evans et al. .......................... | 707/1 |

OTHER PUBLICATIONS

European Search Report for European Application No. 11153041.6 mailed Oct. 1, 2012.

\* cited by examiner

| TYPE 0 | | |
|---|---|---|
| | DEVICE | BLOCK |
| 0 | | | D0
| 1 | | | D1
| 2 | | | D2
| 3 | | | D3
| 4 | | | D4
| 5 | | | D5
| 6 | | | D6
| 7 | | | D7
| 8 | | | D8
| 9 | | | D9
| 10 | | | D10
| 11 | | | D11
| 12 | | | D12
| 13 | | | D13
| 14 | | | D14
| 15 | | | D15
| 16 | | | D16
| 17 | | | D17
| 18 | | | D18
| 19 | | | D19
| 20 | | | D20
| 21 | | | D21
| 22 | | | D22
| 23 | | | D23

FIG. 6A

| TYPE 1 | | |
|---|---|---|
| | DEVICE | BLOCK |
| 0 | | | D0
| 1 | | | D1
| 2 | | | D2
| 3 | | | D3
| 4 | | | D4
| 5 | | | D5
| 6 | | | D6
| 7 | | | D7
| 8 | | | D8
| 9 | | | D9
| 10 | | | D10
| 11 | | | D11
| 12 | | | D12
| 13 | | | D13
| 14 | | | D14
| 15 | | | SI0
| 16 | | | DI0
| 17 | | | TI0
| 18 | | | SI1
| 19 | | | DI1
| 20 | | | TI1
| 21 | | | SI2
| 22 | | | DI2
| 23 | | | TI2

FIG. 6B

| TYPE 2 | | |
|---|---|---|
| | DEVICE | BLOCK |
| 0 | | | SI0
| 1 | | | DI0
| 2 | | | TI0
| 3 | | | SI1
| 4 | | | DI1
| 5 | | | TI1
| 6 | | | SI2
| 7 | | | DI2
| 8 | | | TI2
| 9 | | | SI3
| 10 | | | DI3
| 11 | | | TI3
| 12 | | | SI4
| 13 | | | DI4
| 14 | | | TI4
| 15 | | | SI5
| 16 | | | DI5
| 17 | | | TI5
| 18 | | | SI6
| 19 | | | DI6
| 20 | | | TI6
| 21 | | | SI7
| 22 | | | DI7
| 23 | | | TI7

FIG. 6C

| TYPE 3 | | |
|---|---|---|
| | DEVICE | BLOCK |
| 0 | | | TI0
| 1 | | | TI1
| 2 | | | TI2
| 3 | | | TI3
| 4 | | | TI4
| 5 | | | TI5
| 6 | | | TI6
| 7 | | | TI7
| 8 | | | TI8
| 9 | | | TI9
| 10 | | | TI10
| 11 | | | TI11
| 12 | | | TI12
| 13 | | | TI13
| 14 | | | TI14
| 15 | | | TI15
| 16 | | | TI16
| 17 | | | TI17
| 18 | | | TI18
| 19 | | | TI19
| 20 | | | TI20
| 21 | | | TI21
| 22 | | | TI22
| 23 | | | TI23

FIG. 6D

| MODE | DIRECTORY |
|---|---|
| OWNER | ROOT |
| TIMESTAMP | 65536 |
| SIZE | 345 |
| PARITY COUNT | 0 |
| MIRROR COUNT | 3 |
| VERSION | 1 |
| TYPE | 1 |
| DEVICE 1 | BLOCK 11 |
| DEVICE 2 | BLOCK 21 |
| DEVICE 3 | BLOCK 31 |
| REFERENCE COUNT | 1 |
| FLAGS | 777 |
| PARITY MAP POINTER | NULL |

FIG. 7A

| | DEVICE | BLOCK |
|---|---|---|
| 0 | 1 | 375 |
| 1 | 2 | 223 |
| 2 | 3 | 532 |
| 3 | 4 | 791 |
| 4 | 5 | 101 |
| 5 | 1 | 376 |
| 6 | 2 | 224 |
| 7 | 3 | 533 |
| 8 | 4 | 792 |
| 9 | 5 | 102 |
| 10 | 1 | 377 |
| 11 | 2 | 225 |
| ... | ... | ... |

810

| | DEVICE | BLOCK |
|---|---|---|
| 0 | 6 | 897 |
| 1 | 7 | 003 |
| 2 | 8 | 321 |
| 3 | 9 | 452 |
| 4 | 10 | 721 |
| 5 | 6 | 651 |
| 6 | 7 | 981 |
| 7 | 8 | 133 |
| 8 | 9 | 727 |
| 9 | 10 | 563 |
| 10 | 6 | 229 |
| 11 | 7 | 583 |
| ... | ... | ... |

| | DEVICE | BLOCK |
|---|---|---|
| 0 | 11 | 001 |
| 1 | 12 | 001 |
| 2 | 13 | 001 |
| 3 | 14 | 001 |
| 4 | 15 | 001 |
| 5 | 11 | 011 |
| 6 | 12 | 011 |
| 7 | 13 | 011 |
| 8 | 14 | 011 |
| 9 | 15 | 011 |
| 10 | 11 | 021 |
| 11 | 12 | 021 |
| ... | ... | ... |

FIG. 8B

DISTRIBUTED FILE SYSTEM FOR INTELLIGENTLY MANAGING THE STORING AND RETRIEVAL OF DATA

PRIORITY INFORMATION

This utility patent application is a continuation of allowed U.S. patent application Ser. No. 10/007,003 filed on Nov. 9, 2001, which claims priority to U.S. Provisional Patent Application No. 60/309,803 filed on Aug. 3, 2001, the benefits of which are claimed under 35 U.S.C. §120 and 35 U.S.C. §119, respectively, and both of which are further incorporated herein by reference.

FIELD OF THE INVENTION

The systems and methods of the present invention relate generally to the field of distributed file storage, and in particular to intelligent distributed file management.

BACKGROUND

The explosive growth of the Internet has ushered in a new area in which information is exchanged and accessed on a constant basis. In response to this growth, there has been an increase in the size of data that is being shared. Users are demanding more than standard HTML documents, wanting access to a variety of data, such as, audio data, video data, image data, and programming data. Thus, there is a need for data storage that can accommodate large sets of data, while at the same time provide fast and reliable access to the data.

One response has been to utilize single storage devices which may store large quantities of data but have difficulties providing high throughput rates. As data capacity increases, the amount of time it takes to access the data increases as well. Processing speed and power has improved, but disk I/O (Input/Output) operation performance has not improved at the same rate making I/O operations inefficient, especially for large data files.

Another response has been to allow multiple servers access to shared disks using architectures, such as, Storage Area Network solutions (SANs), but such systems are expensive and require complex technology to set up and to control data integrity. Further, high speed adapters are required to handle large volumes of data requests.

One problem with conventional approaches is that they are limited in their scalability. Thus, as the volume of data increases, the systems need to grow, but expansion is expensive and highly disruptive.

Another common problem with conventional approaches is that they are limited in their flexibility. The systems are often configured to use predefined error correction control. For example, a RAID system may be used to provide redundancy and mirroring of data files at the physical disk level giving administrators little or no flexibility in determining where the data should be stored or the type of redundancy parameters that should be used.

SUMMARY

The intelligent distributed file system advantageously enables the storing of file data among a set of smart storage units which are accessed as a single file system. The intelligent distributed file system advantageously utilizes a metadata data structure to track and manage detailed information about each file, including, for example, the device and block locations of the file's data blocks, to permit different levels of replication and/or redundancy within a single file system, to facilitate the change of redundancy parameters, to provide high-level protection for metadata, to replicate and move data in real-time, and so forth.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 6A illustrates one embodiment of a data location table structure.

FIG. 6B illustrates an additional embodiment of a data location table structure.

FIG. 6C illustrates an additional embodiment of a data location table structure.

FIG. 6D illustrates an additional embodiment of a data location table structure.

FIG. 7A illustrates one embodiment of a metadata data structure for a directory.

FIG. 8B illustrates an additional embodiment of a data location table.

DETAILED DESCRIPTION OF PREFERRED EMBODIMENTS

Figure 1:
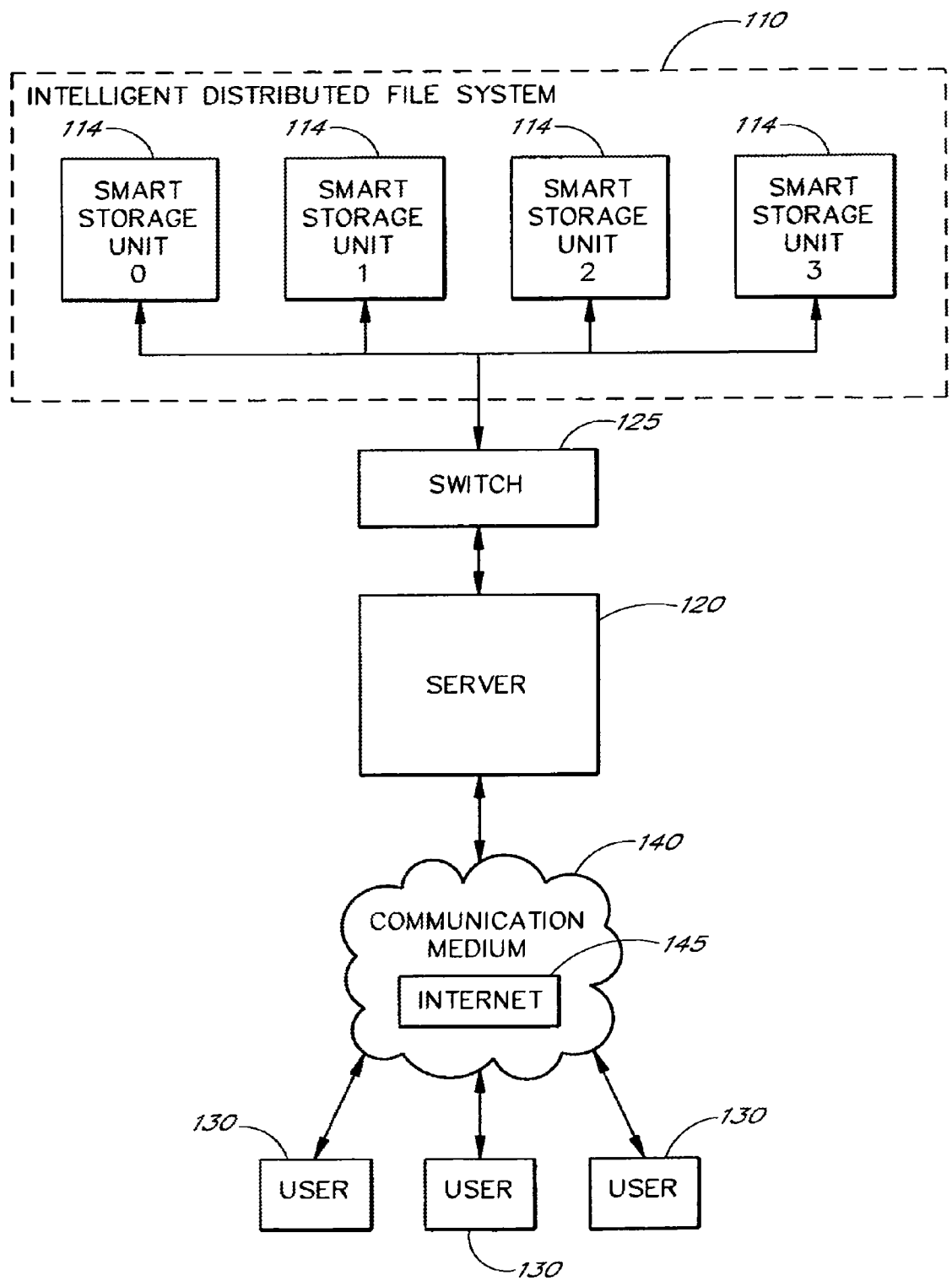
FIG. 1 illustrates a high-level block diagram of one embodiment of the present invention.

Systems and methods which represent one embodiment and example application of the invention will now be described with reference to the drawings. Variations to the systems and methods which represent other embodiments will also be described.

For purposes of illustration, some embodiments will be described in the context of Internet content-delivery and web hosting. The inventors contemplate that the present invention is not limited by the type of environment in which the systems and methods are used, and that the systems and methods may be used in other environments, such as, for example, the Internet, the World Wide Web, a private network for a hospital, a broadcast network for a government agency, an internal network of a corporate enterprise, an intranet, a local area network, a wide area network, and so forth. The figures and descriptions, however, relate to an embodiment of the invention wherein the environment is that of Internet content-delivery and web hosting. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

I. Overview

The systems and methods of the present invention provide an intelligent distributed file system which enables the storing of data among a set of smart storage units which are accessed as a single file system. The intelligent distributed file system tracks and manages detailed metadata about each file. Metadata may include any data that relates to and/or describes the file, such as, for example, the location of the file's data blocks, including both device and block location information, the location of redundant copies of the metadata and/or the data blocks (if any), error correction information, access information, the file's name, the file's size, the file's type, and so forth. In addition, the intelligent distributed file system permits different levels of replication and/or redundancy for different files and/or data blocks which are managed by the file system, facilitates the changing of redundancy parameters while the system is active, and enables the real-time replication and movement of metadata and data. Further, each smart storage unit may respond to a file request by locating and collecting the file's data from the set of smart storage units.

The intelligent distributed file system advantageously provides access to data in situations where there are large numbers of READ requests especially in proportion to the number of WRITE requests. This is due to the added complexities of locking on intelligent group of smart storage units, as well as journaling on the individual smart storage units to ensure consistency. Furthermore, the intelligent distributed file system advantageously handles block transactions wherein requests for large blocks of data are common.

One benefit of some embodiments is that the metadata for files and directories is managed and accessed by the intelligent distributed file system. The metadata may indicate where the metadata for a directory or file is located, where content data is stored, where mirrored copies of the metadata and/or content data are stored, as well as where parity or other error correction information related to the system is stored. Data location information may be stored using, for example, device and block location information. Thus, the intelligent distributed file system may locate and retrieve requested content data using metadata both of which may be distributed and stored among a set of smart storage units. In addition, because the intelligent distributed file system has access to the metadata, the intelligent distributed file system may be used to select where data should be stored and to move, replicate, and/or change data as requested without disrupting the set of smart storage units.

Another benefit of some embodiments is that data for each file may be stored across several smart storage units and accessed in a timely manner. Data blocks for each file may be distributed among a subset of the smart storage units such that data access time is reduced. Further, different files may be distributed across a different number of smart storage units as well as across different sets of smart storage units. This architecture enables the intelligent distributed file system to store data blocks intelligently based on factors, such as, the file's size, importance, anticipated access rate, as well as the available storage capacity, CPU utilization, and network utilization of each smart storage unit.

An additional benefit of some embodiments is that the systems and methods may be used to provide various protection schemes, such as, error correction, redundancy, and mirroring, on a data block or file basis such that different data blocks or files stored, among the smart storage units may have different types of protection. For example, some directories or files may be mirrored, others may be protected with error and/or loss correction data using a variety of error or loss correction schemes, and others of lower importance may not use any protection schemes.

A further benefit of some embodiments is that the systems and methods may enable the real-time addition, deletion, and/or modification of smart storage units without disrupting or interrupting ongoing data requests. Thus, as more storage is required, additional smart storage units may be added to the set of smart storage units and incorporated into the intelligent distributed file system in real-time without interrupting the file requests or having to take the existing smart storage units offline. The existing smart storage units may process requests for files as the data blocks of existing files or new files are being distributed by the intelligent distributed file system across the set of smart storage units which now includes the new smart storage units.

Another benefit of some embodiments is that the systems and methods may perform real-time modifications to the storage of the data blocks by replicating those blocks on one or more of the smart storage units, and thus creating multiple points of access for any individual data block. This replication helps to reduce the utilization of CPU and network resource requirements for individual smart storage units for a file or group of files for which frequent access patterns have been observed. These access patterns are monitored by the smart storage units, and the intelligent distributed file system affords the smart storage units the flexibility to make such data replications while the intelligent distributed file system is still operating.

II. Sample Operation

For purposes of illustration, a sample scenario will now be discussed in which the intelligent distributed file system is used in operation. In this sample scenario, the intelligent distributed file system is used by a company that offers movie downloads via an Internet web site. The company may use the intelligent distributed file system to store and manage copies of downloadable movies as well as movie trailers, advertisements, and customer information that are accessed by customers via the web site. The data may be stored with various levels of protection and stored across multiple smart storage units for fast access.

For example, the company may want to store customer survey emails across several smart storage units in the intelligent distributed file system to provide fast access to the emails. The company may, however, keep backup tapes of all emails and may feel that it is not vital to enable immediate recovery of customer surveys. The company may instruct the intelligent distributed file system not to use error correction or mirroring protection on the customer survey emails. Thus, if one or more of the smart storage units become inaccessible, the company may feel it is acceptable that access to the customer survey email on those smart storage units is delayed until the emails can be restored from the backup tapes.

For advertisements, the company may instruct the intelligent distributed file system to use high error correction parameters such that if one or more smart storage units fail, the intelligent distributed file system can recover the data without interrupting the display of the advertisement. For example, the company may rely upon various fault tolerance measurements to assist in determining how much protection should be given to a particular file. For important information, the company may want to ensure a fault tolerance level of X, and for less important information, the company want to ensure a fault tolerance level of Y where X>Y. It is recognized that other measurements, in addition to or instead of fault tolerance may be used, and that fault tolerance is used to illustrate one measurement of reliability. Thus, the company may ensure its advertisers that the advertisements will be available on a reliable basis even if one or more of the smart storage units fail.

For the top movie downloads, the company may advantageously set up the intelligent distributed file system to automatically store multiple copies of the movie data to enable more customers access to the data and to ensure that if one or more of the smart storage units fail, then the missing data may be regenerated or retrieved from other locations. Moreover, additional copies of the top movie downloads may be created and stored among the smart storage units if the number of requests increase and/or if one or more of the smart storage units begins to become flooded with requests for the data that resides on the smart storage unit.

The company may choose to offer other movies that are not as popular and may instruct the intelligent distributed file system to store fewer copies due to the lower demand. Further, as the "top download movies" become less popular, the company may advantageously set up the intelligent distributed file system to delete extra copies of the movies from the smart storage units on which the movies are stored and move the "less popular" movies to smart storage units with slower performance (e.g., those smart storage units with less available disk space). The intelligent distributed file system may be set to automatically take care of these tasks using the smart storage units.

In addition, as the company acquires more movies, the company may add additional smart storage units to the intelligent distributed file system. The company may then use the new smart storage units to store more movies, to store more copies of existing movies, and/or to redistribute existing movie data to improve response time. The additional smart storage units are incorporated into the intelligent distributed file system such that the intelligent distributed file system appears as a single file system even though the intelligent distributed file system manages and stores data among a set of multiple smart storage units.

In this example, the intelligent distributed file system provides the company the ability to offer reliable and fast access to top movie downloads, fast access to less popular movies, and access to customer survey emails. For each file, the company may set error and/or loss correction parameters and may select how many additional copies of the file should be stored. In some situations, the company may manually choose how many copies of data should be stored and determine where to store the data. In other situations, the company may rely on the features of the intelligent distributed file system to select how many copies of data should be stored, the error and/or loss correction scheme that should be used (if any), and/or where the data should be stored. Thus, the company is able to efficiently use its storage space to better respond to user requests. Storage space is not wasted on sparsely requested files, and error correction information is not generated and stored for unimportant files.

While the example above involves a company which offers movies for downloading, it is recognized that this example is used only to illustrate features of one embodiment of an intelligent distributed file system. Further, the intelligent distributed file system may be used in other environments and may be used with other types of and/or combinations of data, including, for example, sound files, audio files, graphic files, multimedia files, digital photographs, executable files, and so forth.

III. Intelligent Distributed File System

FIG. 1 illustrates one embodiment of an intelligent distributed file system 110 which communicates with a network server 120 to provide remote file access. The intelligent distributed file system 110 may communicate with the network server 120 using a variety of protocols, such as, for example, NFS or CIFS. Users 130 interact with the network server 120 via a communication medium 140, such as the Internet 145, to request files managed by the intelligent distributed file system 110. The exemplary intelligent distributed file system 110 makes use of a switch component 125 which communicates with a set of smart storage units 114 and the network server 120. The intelligent distributed file system 110 enables data blocks of an individual file to be spread across multiple smart storage units 114. This data is stored such that access to the data provides a higher throughput rate than if the data was stored on a single device. In addition, the intelligent distributed file system 110 may be used to store a variety of data files which are stored using a variety of protection schemes.

The exemplary intelligent distributed file system 110 stores data among a set of smart storage units 114. For a more detailed description about the smart storage units 114, please refer to the section below entitled "Smart Storage Units."

The exemplary intelligent distributed file system makes use of a switch component 125, such as a load balancing switch, that directs requests to an application server that can handle the type of data that has been requested. The incoming requests are forwarded to the appropriate application servers using high-speed technology to minimize delays to ensure data integrity.

It is recognized that a variety of load balancing switches 125 may be used, such as, for example, the 1000 Base-T (copper) Gigabit load Balancing Ethernet Switch, the Extreme Networks Summit 7I, Foundry Fast Iron II, Nortel Networks Alteon ACEswitch 180, F5 Big-Ip), as well as standard Ethernet switches or other load balancing switches. The intelligent distributed file system makes use of a switch which supports large frame sizes, for example, "jumbo" Ethernet frames. In addition, the load balancing switch 125 may be implemented using Foundry Networks' ServerIron switches, Asante's InstraSwitch 6200 switches, Asante's HotStack, Cisco's Catalyst switches, as well as other commercial products and/or proprietary products. One of ordinary skill in the art, however, will recognize that a wide range of switch components 125 may be used, or other technology may be used. Furthermore, it is recognized that the switch component 125 may be configured to transmit a variety of network frame sizes.

Files of high importance may be stored with high error correction parameters that provide the data with a high recovery rate in case of disk, motherboard, CPU, operating system, or other hardware or software failure that prevents access to one or more of the smart storage units. If any data is lost or missing, a smart storage unit 114 may use the redundancy information or mirroring information in the metadata to obtain the data from another location or to recreate the data. Files in high demand may be mirrored in real-time across the additional smart storage units 114 to provide even higher throughput rates.

In one embodiment of the intelligent distributed file system 110, the metadata data structure has at least the same protection as the data that it references including any descendants of the directory that corresponds to the metadata data structure. Loss of data in a metadata data structure harms the intelligent distributed file system 110 as it is difficult to retrieve the data without its metadata data structure. In the intelligent distributed file system 110, alternate copies of the metadata data structure may be mirrored in as many locations as necessary to provide the required protection. Thus, a file with parity protection may have its metadata data structure stored with at least the same or greater parity protection and a file mirrored twice may have its metadata structure at least mirrored in two locations.

While FIG. 1 illustrates one embodiment of an intelligent distributed file system 110, it is recognized that other embodiments may be used. For example, additional servers, such as, application severs may communicate with the switch component 125. These application severs may include, for example, audio streaming servers, video streaming servers, image processing servers, database servers, and so forth. Furthermore, there may be additional devices, such as workstations, that communicate with the switch component 125. In addition, while FIG. 1 illustrates an intelligent distributed file system 110 working with four smart storage units 114, it is recognized that the intelligent distributed file system 110 may work with different numbers of smart storage units 114.

It is also recognized that the term "remote" may include devices, components, and/or modules not stored locally, that is not accessible via the local bus. Thus, a remote device may include a device which is physically located in the same room and connected via a device such as a switch or a local area network. In other situations, a remote device may also be located in a separate geographic area, such as, for example, in a different location, country, and so forth.

It is also recognized that a variety of types of data may be stored using the intelligent distributed file system 110. For example, the intelligent distributed file system 110 may be used with large file applications, such as, for example, video-on-demand, online music systems, web-site mirroring, large databases, large graphic files, CAD/CAM design, software updates, corporate presentations, insurance claim files, medical imaging files, corporate document storage, and so forth.

Figure 2:
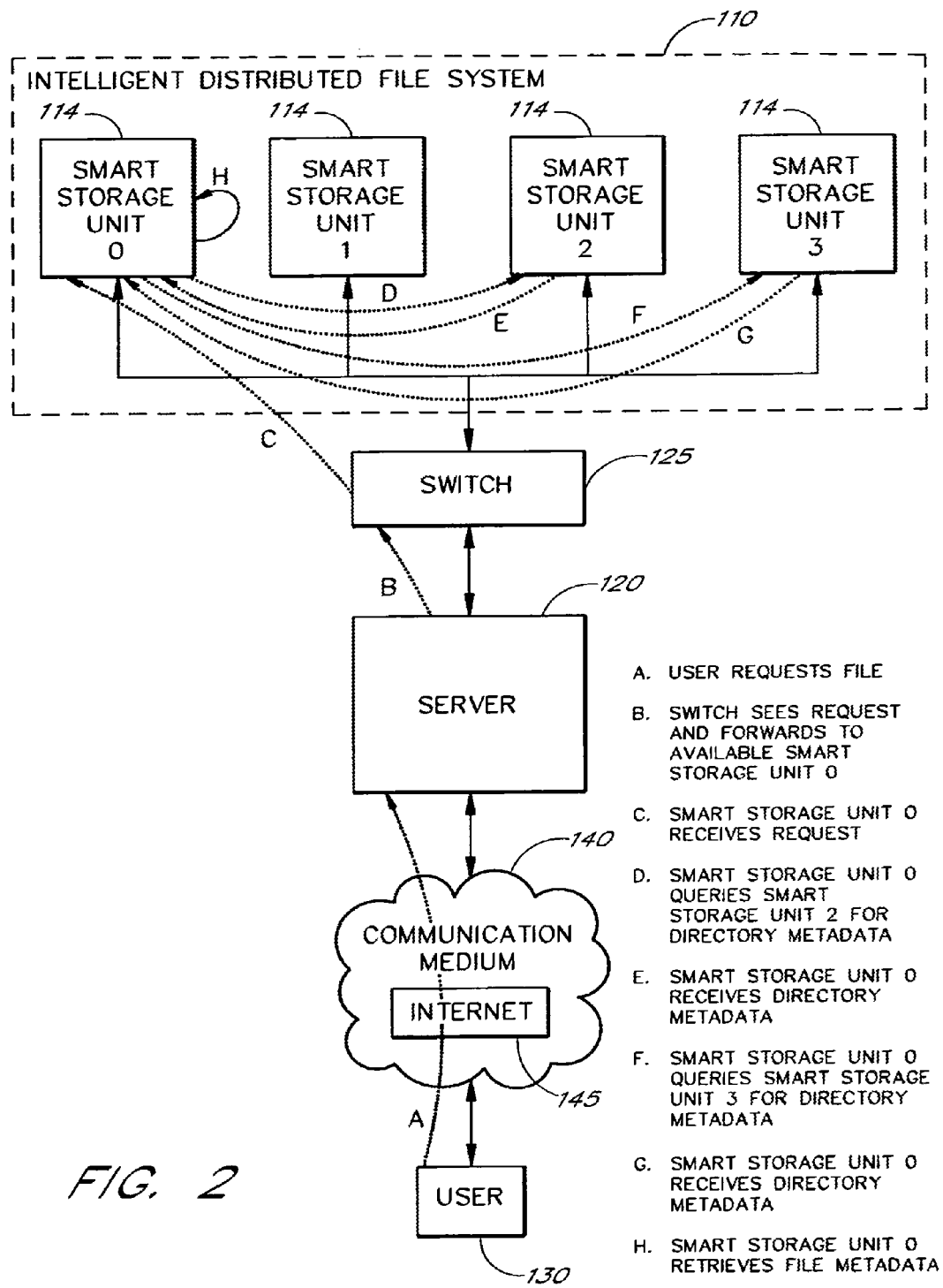
FIG. 2 illustrates a sample flow of data among the components illustrated in FIG. 1.

FIG. 2 illustrates a sample environment in which a web site user 130 has submitted a request to watch an on-demand digital video. In event A, the user 130 sends a request via the Internet 145 to a web site requesting to view a copy of the movie, mymovie.movie. The request is received by the web site's server 120, and the server 120 determines that the file is located at \movies\comedy\mymovie.movie. In event B, the switch component 125 of the intelligent distributed file system 110 sees the request to connect to the intelligent distributed file system 110 and forwards the request to an available smart storage unit 114, such as smart storage unit 0, using standard load balancing techniques. In event C, smart storage unit 0 receives the request for the file /DFSR/movies/comedy/mymovie.movie and determines from its root metadata data structure (for the root directory /DFSR) that the metadata data structure for the subdirectory movies is stored with smart storage unit 2. In event D, smart storage unit 0 sends a request to smart storage unit 2 requesting the location of the metadata data structure for the subdirectory comedy. In event E, smart storage unit 0 receives information that the metadata data structure for the subdirectory comedy is stored with smart storage unit 3. In event F, smart storage unit 0 sends a request to smart storage unit 3 requesting the location of the metadata data structure for the file mymovie.movie. In event G, smart storage unit 0 receives information that the metadata data structure for the file mymovie.movie is stored with smart storage unit 0. Smart storage unit 0 then retrieves the metadata data structure for the file mymovie.movie from local storage. From the metadata data structure, smart storage unit 0 retrieves the data location table for mymovie.movie which stores the location of each block of data in the file. Smart storage unit 0 then uses the data location table information to begin retrieving locally stored blocks and sending requests for data stored with other smart storage units.

After the file's data or a portion of the data has been retrieved, the file data is sent to the requesting server 120 to be forwarded to the requesting user 130. In one example, the file data may be routed to a video streaming server which regulates how and when the data is sent to the user 130. It is recognized that in some embodiments, it may be advantageous to utilize read ahead techniques to retrieve more data then requested so as to reduce the latency of the requests.

IV. Intelligent File System Structure

Table 1 illustrates one embodiment of a sample set of file system layers through which a file request is processed in order to access the physical storage device. The exemplary file system layers include a User layer, a Virtual File System layer, a Local File System layer, a Local File Store layer, and a Storage Device layer.

TABLE 1

| | |
|---|---|
| User Space | User Layer |
| Kernel Space | Virtual File System Layer |
| | Local File System Layer |
| | Local File Store Layer |
| | Storage Device Layer |

In one type of file request, the request is received via a user-level protocol application for file sharing, such as, for example, HTTPD (the Apache web server), FTPD, or 5 MBD used on Unix which implements a version of the Microsoft Windows file sharing server protocol. The user-level protocol application performs a kernel level open, read, seek, write, or close system call, such as, for example, by making a function call to libc, the C runtime library.

The system call is passed onto the Virtual File System layer ("VFS"), which maintains a buffer cache. The buffer cache may be, for example, a least recently used ("LRU") cache of buffers used to store data or metadata data structures which are received from the lower file system layers.

The next layer is the Local File System layer which maintains the hierarchical naming system of the file system and sends directory and filename requests to the layer below, the Local File Store layer. The Local File System layer handles metadata data structure lookup and management. For example, in some systems, such as Unix-based file systems, the metadata data structure is a file abstraction which includes information about file access permissions, data block locations, and reference counts. Once a file has been opened via its name, other file operations reference the file via a unique identifier which identifies the metadata structure for the specific file. The benefits of this approach are that a single file may have many different names, a single file may be accessed via different-paths, and new files may be copied over old files in the VFS namespace without overwriting the actual file data via the standard UNIX user level utilities, such as, for example, the 'mv' command. These benefits may be even more advantageous in environments such as content-delivery and web hosting because content may be updated in place without disrupting current content serving. The reference count within the metadata data structure enables the system to only invalidate the data blocks once all open file handles have been closed.

The fourth layer is the Local File Store layer which handles "buffer request to block request" translation and data buffer request management. For example, the Local File Store layer uses block allocation schemes to improve and maximize throughput for WRITES and READS, as well as block retrieval schemes for reading.

The last layer is the Storage Device layer which hosts the device driver for the particular piece of disk hardware used by the file system. For example, if the physical storage device is an ATA disk, then the Storage Device layer hosts the ATA disk driver.

V. Smart Storage Units

In one embodiment, the smart storage unit 114 is a plug-and-play, high-density, rack-mountable appliance device that is optimized for high-throughput data delivery. The smart storage unit may be configured to communicate with a variety of other smart storage units so as to provide a single virtual file system. As more storage space is needed or if one or more of the smart storage units fail, additional smart storage units may be installed without having to take the entire system down or cause interruption of service.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

Figure 3:
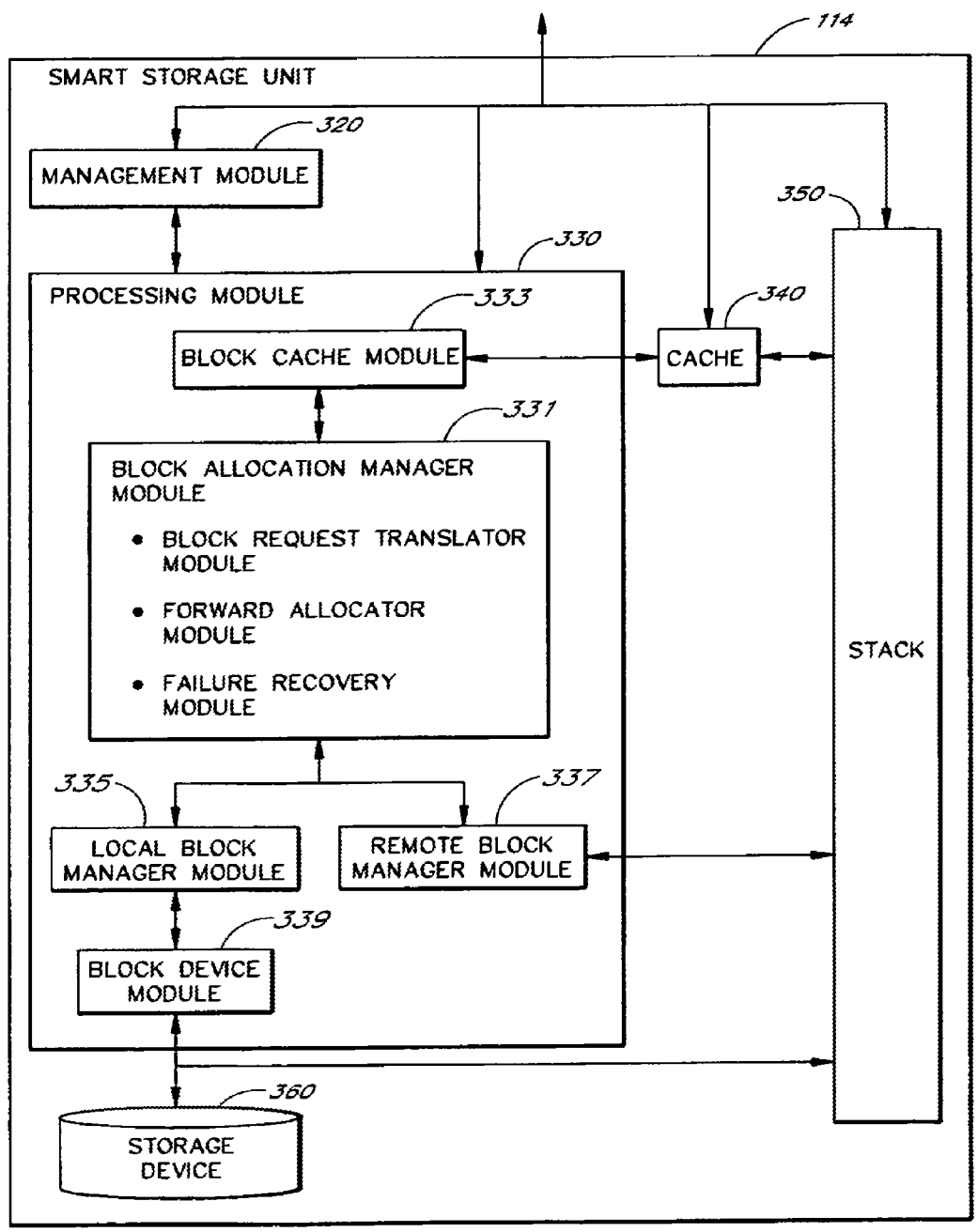
FIG. 3 illustrates a high-level block diagram of a sample smart storage unit.

FIG. 3 illustrates one embodiment of a smart storage unit 114 which includes a management module 320, a processing module 330, a cache 340, a stack 350, and a storage device 360. The exemplary smart storage unit 114 may be configured to communicate with the switch component 125 to send and receive requests as illustrated in FIG. 1.

A. Management Module

In one embodiment, the smart storage unit includes a management module 320 for performing management tasks, such as, for example, installation, parameter setting, monitoring of the intelligent distributed file system, logging of events that occur on the intelligent distributed file system 110, and upgrading.

B. Processing Module

The exemplary processing module 330 may be configured to receive requests for data files, retrieve locally and/or remotely stored metadata about the requested data files, and retrieve the locally and/or remotely stored data blocks of the requested data files. In addition, the processing module 330 may also perform data recovery and error correction in the event that one or more of the requested data blocks is corrupt or lost.

In one embodiment, the processing module 330 includes five modules to respond to the file requests, a block allocation manager module 331, a block cache module 333, a local block manager module 335, a remote block manager module 337 and a block device module 339.

1. Block Allocation Manager Module

The block allocation manager 331 module determines where to allocate blocks, locates the blocks in response to a READ request, and conducts device failure recovery. Information about where to allocate the blocks may be determined by policies set as default parameters, policies set by the system administrator via tools, such as a graphical user interface or a shell interface, or a combination thereof. In one embodiment, the block allocation manager 331 resides at the Local File System layer and works in conjunction with standard networking software layers, such as TCP/IP and Ethernet, and/or instead of Berkeley Software Design Universal File System ("BSD UPS").

The exemplary block allocation manager 331 includes three submodules, a block request translator module, a forward allocator module, and a failure recovery module.

a. Block Request Translator Module

The block request translator module receives incoming READ requests, performs name lookups, locates the appropriate devices, and pulls the data from the device to fulfill the request. If the data is directly available, the block request translator module sends a data request to the local block manager module or to the remote block manager module depending on whether the block of data is stored on the local storage device or on the storage device of another smart storage unit.

In one embodiment, the block request translator module includes a name lookup process which is discussed below in the section entitled "Intelligent Distributed File System Processes—Processing Name Lookups."

The block request translator module may also respond to device failure. For example, if a device is down, the block request translator module may request local and remote data blocks that may be used to reconstruct the data using, for example, parity information. Thus, the data may be generated even though the READ may not be performed. In addition, the block request translator module may communicate with the failure recovery module such that the failure recovery module may re-create the data using parity or other error or loss correction data and re-stripe the loss correction data across free space in the intelligent distributed file system. In other embodiments, the block request translator module may request clean copies of corrupt or missing data.

b. Forward Allocator Module

The forward allocator module determines which device's blocks should be used for a WRITE request based upon factors, such as, for example, redundancy, space, and performance. These parameters may be set by the system administrator, derived from information embedded in the intelligent distributed file system 110, incorporated as logic in the intelligent distributed file system 110, or a combination thereof. The forward allocator module 110 receives statistics from the other smart storage units that use the intelligent distributed file system, and uses those statistics to decide where the best location is to put new incoming data. The statistics that are gathered include, for example, measurements of CPU utilization, network utilization, and disk utilization.

The forward allocator module may also receive latency information from the remote block manager module based upon the response times of the remote smart storage units. If the inter-device latency reaches a high level relative to other smart storage units, the allocation schemes may be adjusted to favor other smart storage units underutilizing the slow smart storage unit, if possible, based on the redundancy settings. In one advantageous example, the intelligent distributed file system may have moved blocks of data from one smart storage unit to another smart storage unit, updating the corresponding metadata structures accordingly. The latency conditions may be logged through a logging system and reported to the system administrator. Reasons for slow link conditions may be, for example, bad network cards, incorrect duplex negotiation, or a device's data being relatively frequently read or written to.

A variety of strategies may be used to determine where to store the data. These strategies may be adjusted depending on the goals of the system, such as, compliance with parameters set by the system's administrator, meeting of selected redundancy levels, and/or performance improvement. The following provides a few sample strategies that may be employed by the forward allocator module to store data. It is recognized that a wide variety of strategies may be used in addition to or in conjunction with those discussed below.

The forward allocator module may include an allocation scheme for striping data across multiple smart storage units. Striping data is a common technology typically used in high-end RAID storage devices, but may be employed in single user workstation machines with multiple disks. Striping data simply means that different portions of a file's data live and/or are stored on different storage devices or disks. The advantage to striping data is that when READ requests span the blocks located on multiple disks, each disk participates in the aggregate throughput of data retrieval. With typical systems, striping of data is done at the software device layer. That is, the file system has no information about the striping of the data. Only the software layer underneath the file system understands this structure. In some specialized pieces of hardware, this striping is done even below the software device layer at the actual hardware layer. In the intelligent distributed file system 110, the file system itself handles the striping of data. This implementation provides greater flexibility with striping configurations. As an example, typical RAID technologies are limited in that all disks must be of the same size and have the same performance characteristics. These constraints are necessary to ensure that data is spread evenly across the different devices. For a more detailed discussion about RAID, please refer to "The RAID Book," by Paul Massiglia, Sixth Edition (1997), which is herein incorporated by reference.

With the intelligent distributed file system 110, differing disks and disk sizes may be used in various smart storage units 114 and participate in the file striping. The forward allocator module looks up in the root metadata data structure for disk device information and calculates the number of smart storage units across which the file data should be spread using performance metrics or preset rules. The forward allocator module may then allocate the data blocks of the file to a set of smart storage units.

The forward allocator module may also include an allocation scheme for parity or other error or loss correction protection. In most RAID systems, when file striping is used, parity protection is also used such that all of the disks, except one, are used for data storage. The last disk is purely used for parity information. This parity information is typically calculated by taking a bitwise exclusive or ("XOR") of each block of data across all of the data disks. This parity information is used to perform data recovery when a disk failure occurs. The lost data is recalculated from taking the bitwise XOR of the remaining disks' data blocks and the parity information. In typical RAID systems, the data is unrecoverable until a replacement disk in inserted into the array to rebuild the lost data.

With the intelligent distributed file system 110, the lost data may be re-computed and re-written in free space on other portions of the remaining smart storage units because the parity protection takes place at the file system layer instead of the software device layer. If there is not enough free space left to re-write the data, the parity data may be overwritten with re-calculated data, and the fact that the redundancy has dropped below the original levels may be logged and/or reported to the system administrator.

The forward allocator module may also include an allocation scheme for mirroring of data, that is making multiple copies of the data available on different smart storage units. The forward allocator module may use an allocation scheme to load balance the locations of the blocks of the data across the smart storage units using those smart storage units that are least used in terms of storage space, network utilization, and/or CPU utilization. Mirroring may provide increased performance and increased fault tolerance. If mirroring is requested for certain pieces of content, the forward allocator module allocates space for the original data as well as the mirrored data. If a fault tolerance level of greater than one is requested, the forward allocator may logically divide the smart storage units, or a subset of the smart storage units, by the fault tolerance count and create mirrors of striped data. For example, if there are ten smart storage units 114 in an intelligent distributed file system 110, and a fault tolerance of two is requested, then the forward allocator may logically break the intelligent distributed file system into two sections of five smart storage units each, stripe the data across four smart storage units in each section, and use the fifth smart storage units from each section as a parity disk. This division of smart storage units may be referred to as an array mirror split.

c. Failure Recovery Module

The failure recovery module reconfigures the intelligent distributed file system 110, in real-time, to recover data which is no longer available due to a device failure. The failure recovery module may perform the reconfiguration without service interruptions while maintaining performance and may return the data to desired redundancy levels in a short period of time.

As discussed above, the remote block manager module 337 detects failures and passes notification of such failures to the failure recovery module. For an initial failure, the failure recovery module locates any data blocks that do not meet the redundancy parameters as requested by the system administrator or as set by the intelligent distributed file system 110.

First, data that can be recreated from parity information is recreated and a request is sent to the forward allocator module to allocate space for the new data. The forward allocator monitors CPU and network utilization and begins operation aggressively until CPU and network utilization reaches a predetermined mark. This predetermined mark may be set by the system administrator or pre-set according to factors such as, for example, the computer processor. Once the mark is reached, the failure recovery module may advantageously re-calculate data at the rate achieved at the time of the mark to reduce impact on the smart storage unit's performance.

If a recently failed device comes back online, the failure recovery module communicates with the remote block manager module 337 of the recovered device to verify data integrity and fix any inconsistencies.

The intelligent distributed file system 110 may also support the inclusion of a hot standby device. The hot standby device is an idle storage device that is not currently handling any data storage, but will be put into use at the time of a device failure. In such a situation, the failure recovery module may rebuild the lost data using the hot standby device by communicating with the hot standby device's remote block manager module 337.

2. Block Cache Module

The block cache module 333 manages the caching of data blocks, name looks ups, and metadata data structures. In one embodiment, the block cache module 333 works in conjunction with or instead of BSD Virtual File System's buffer cache.

The block cache module 333 may cache data blocks and metadata data blocks using the Least Recently Used caching algorithm, though it is recognized that a variety of caching algorithms that may be used, such as, for example, frequency caching. The block cache module 333 may determine which block caching algorithm to use depending on which performs the best, or in other embodiments, an algorithm may be set as the default.

Least Recently Used caching ("LRU") is the typical caching scheme used in most systems. LRU is based off the principle that once data is accessed it will most likely be accessed again. Thus, data is stored in order of its last usage such that data that has not been accessed for the longest amount of time is discarded.

Frequency caching stores data that has been most frequently accessed. Because disk writes are a relatively time intensive operation, additional performance may be gained by tracking access frequencies in the metadata data structures and caching based on access frequencies.

In addition, the block cache module 333 may utilize an "on demand" protocol or a "read ahead" protocol wherein more data is requested than required. The block cache module 333 may send a request for a set of data and also request some amount of data ahead of the set of data. For example, the block cache module 333 may perform read aheads, such as one packet read aheads, two packet read aheads, ten packet read aheads, twenty packet read aheads, and so forth. In other embodiments, the block cache module 333 may utilize read ahead techniques based upon the latency of the request. For example, the block cache module 333 may perform K packet read aheads where K is calculated using the read rate and the latency of the link. The block cache module 333 may also use other algorithms based on CPU and network utilization to determine the size of the read ahead data. Furthermore, the block cache module may utilize a set caching protocol, or may vary the caching protocol to respond to the system's performance levels.

The cache 340 may be implemented using the default sizes provided with general multi-user operating systems or modified to increase the cache block size to a different amount but without severely impacting system performance. Such modifications may be determined by various performance tests that depend upon factors, such as, for example, the type of data being stored, the processing speed, the number of smart storage units in the intelligent distributed file system, and the protection schemes being used.

3. Local Block Manager Module

The local block manager module 335 manages the allocation, storage, and retrieval of data blocks stored locally on the storage device 360. The local block manager 335 may perform zero copy file reads to move data from the disk to another portion of the storage device 360, such as, for example, the network card, thereby improving performance. The local block manager 335 may also perform modifications based upon the storage device 360 being used so as to increase performance. In one embodiment, the local block manager module 335 resides at the Local File Store layer and may work in conjunction with or instead of FreeBSD Fast File System.

4. Remote Block Manager Module

The remote block manager module 337 manages inter-device communication, including, for example, block requests, block responses, and the detection of remote device failures. In one embodiment, the remote block manager module 337 resides at the Local File System layer.

In one embodiment, the smart storage units 114 may be connected to and/or communicate with the other smart storage devices 114 in the intelligent distributed file system 110 via the remote block managers 337.

The remote block manager modules 337 may enable the smart storage units 114 to talk to each other via a connection such as TCP. In one embodiment, the are at least two TCP connections between each smart storage unit, one for file data transportation and one for control message transportation. The advantage of this dual channel TCP communication architecture is that as long as data blocks are sent in multiples of page sizes, the data may be sent via DMA transfer directly from the network interface card to system memory, and via DMA transfer from system memory to another portion of the system (possibly the network interface card again) without the need for the data to be copied from one portion of system memory to another. This is because there is no need for the CPU to be involved in parsing the data packets as they do not contain non-data headers or identifying information since this information is transferred on the control channel. In high performance server and operating systems, these memory copies from one portion of system memory to another become a severe limitation on system performance.

In one embodiment, the remote block manager modules 337 communicate using messaging communication utilizing messages, such as, for example, data block access messages (e.g. READ, READ_RESPONSE, WRITE, and WRITE_RESPONSE), metadata access messages (e.g. GET_INODE, GET_INODE_RESPONSE, SET_ADDRESS, GET_ADDRESS, and INVALIDATE_INODE), directory messages (e.g., ADD_DIR and REMOVE_DIR), status messages, as well as a variety of other types of messages.

While a dual channel protocol is discussed above, it is recognized that other communication protocols may be used to enable communication among the smart storage units 114.

5. Block Device Module

The block device module 339 hosts the device driver for the particular piece of disk hardware used by the file system. For example, if the physical storage device is an ATA disk, then the block device module 339 hosts the ATA disk driver.

C. Cache

The cache memory or cache 340 may be implemented using a variety of products that are well known in the art, such as, for example, a 1G RAM cache. The cache 340 illustrated in FIG. 3 may store blocks of data that have recently been accessed or are to be accessed within a set amount of time. The cache 340 may be implemented using a high-speed storage mechanism, such as a static RAM device, a dynamic RAM device, an internal cache, a disk cache, as well as a variety of other types of devices. Typically, data is accessed from a cache 340 faster than the time it takes to access the non-volatile storage device. The cache 340 stores data such that if the smart storage unit 114 needs to access data from the storage device 360, the cache 340 may be checked first to see if the data has already been retrieved. Thus, use of the cache 340 may improve the smart storage unit's performance in retrieving data blocks.

D. Network Stack

In one embodiment, the smart storage unit 310 also includes a network stack 350 that handles incoming and outgoing message traffic using a protocol, such as, for example, TCP/IP. It is recognized, however, that other protocols or data structures may be used to implement the stack 350.

E. Storage Device

The storage device 360 is a non-volatile memory device that may be used to store data blocks. The storage device 360 may be implemented using a variety of products that are well known in the art, such as, for example, a 4 1.25 GB ATA100 device, SCSI devices, and so forth. In addition, the size of the storage device 360 may be the same for all smart storage units 114 in an intelligent distributed file system 110 or it may be of varying sizes for different smart storage units 114.

F. System Information

In one embodiment, the smart storage unit 114 runs on a computer that enables the smart storage unit 114 to communicate with other smart storage units 114. The computer may be a general purpose computer using one or more microprocessors, such as, for example, a Pentium processor, a Pentium II processor, a Pentium Pro processor, a Pentium IV processor, an xx86 processor, an 8051 processor, a MIPS processor, a Power PC processor, a SPARC processor, an Alpha processor, and so forth.

In one embodiment, the processor unit runs the open-source FreeBSD operating system and performs standard operating system functions such opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, or IBM® OS/2® operating systems.

In one embodiment, the computer is equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computer may be configured to support a variety of network protocols such as, for example NFS v2/v3 over UDP/TCP, Microsoft® CIFS, HTTP 1.0, HTTP. 1.1, DAFS, FTP, and so forth.

In one embodiment, the smart storage device 114 includes a single or dual CPU 2U rack mountable configuration, multiple ATA100 interfaces, as well as a 1000/100 Network Interface Card that supports jumbo 9 K Ethernet frames. It is recognized, however, that a variety of configurations may be used.

VI. Intelligent Distributed File System Data Structures

Figure 4:
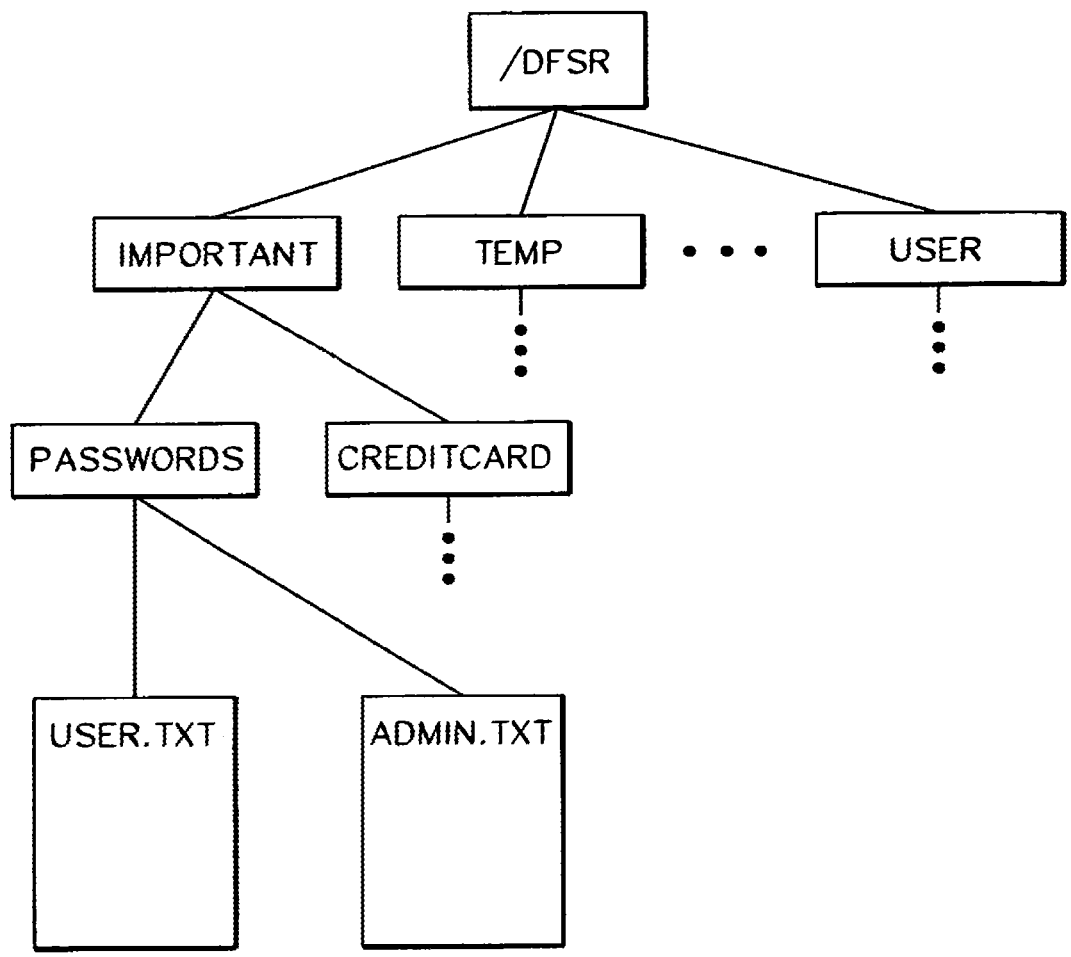
FIG. 4 illustrates a sample file directory.

FIG. 4 illustrates a sample directory structure that may be used with the intelligent distributed file system. In this example, the ROOT directory is named "DFSR" and includes subdirectories IMPORTANT, TEMP, and USER. The IMPORTANT subdirectory includes the subdirectories PASSWORDS and CREDITCARD. The files USER.TXT and ADMIN.TXT are stored in the PASSWORDS subdirectory. Thus, the address for the USER.TXT file is:

/DFSR/IMPORTANT/PASSWORDS/USER.TXT

Information or metadata about the directories and the files is stored and maintained by the intelligent distributed file system 110.

A. Metadata Data Structures

Figure 5:
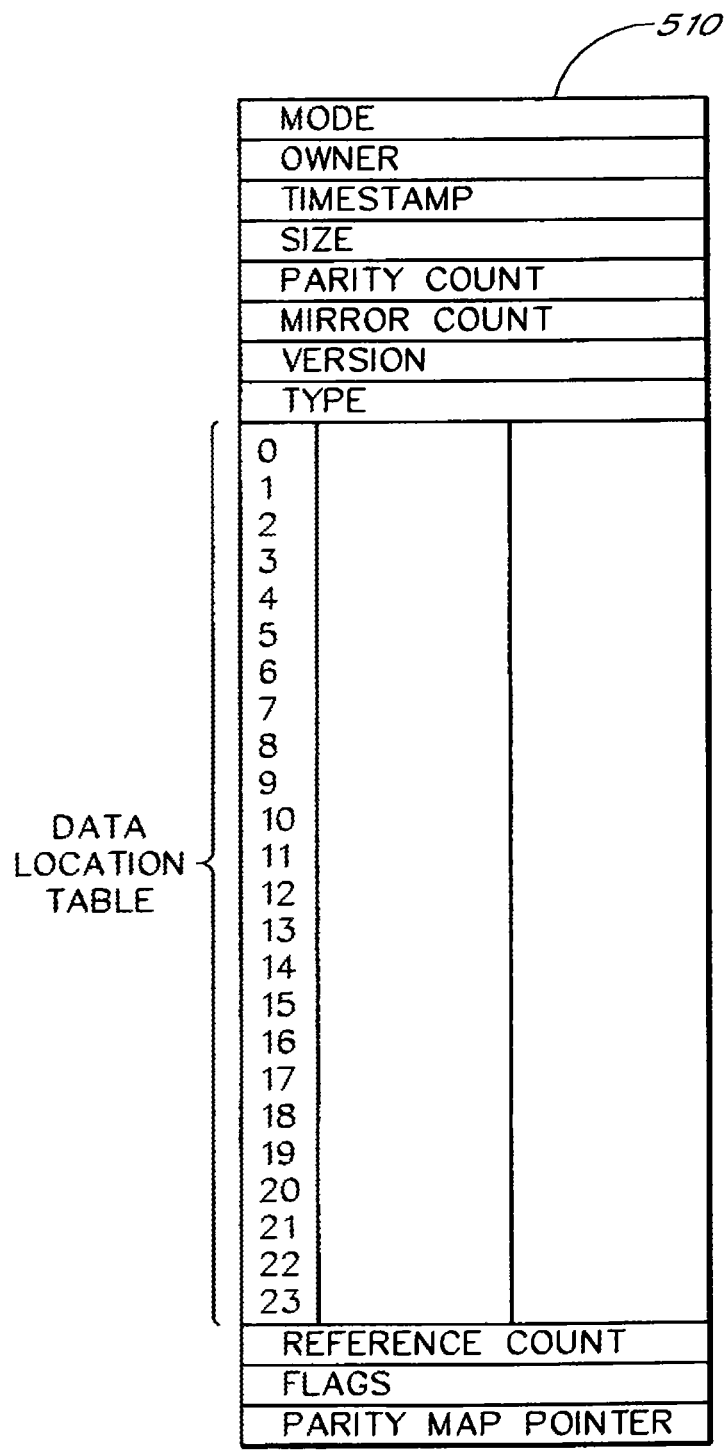
FIG. 5 illustrates one embodiment of a metadata data structure.

FIG. 5 illustrates a sample data structure 510 for storing metadata. The exemplary data structure 510 stores the following information:

| Field | Description |
| --- | --- |
| Mode | The mode of the file (e.g., regular file, block special, character special, directory, symbolic link, fifo, socket, whiteout, unknown) |
| Owner | Account on the smart storage unit which has ownership of the file |
| Timestamp | Time stamp of the last modification of the file |
| Size | Size of the metadata file |
| Parity Count | Number of parity devices used |
| Mirror Count | Number of mirrored devices used |
| Version | Version of metadata structure |
| Type | Type of data location table (e.g., Type 0, Type 1, Type 2, or Type 3) |
| Data Location Table | Address of the data location table or actual data location table information |
| Reference Count | Number of metadata structures referencing this one |
| Flags | File permissions (e.g., standard UNIX permissions) |
| Parity Map Pointer | Pointer to parity block information |

It is recognized that the sample data structure 510 illustrates one embodiment of a data structure 510 for storing metadata and that a variety of implementations may be used in accordance with the invention. For example, the data structure 510 may include different fields, the fields may be of different types, the fields may be grouped and stored separately, and so forth.

FIGS. 6A, 6B, 6C, and 6D provide sample data location table structures for the some of the types of data location tables, that is Type 0, Type 1, Type 2, and Type 3 respectively. In FIG. 6A, the Type 0 data location table includes 24 direct block entries meaning that the entries in the data location table include device/block number pairs which indicate the location in which the data blocks are stored. In FIG. 6B, the Type 1 data location table includes 15 direct block entries, three single-indirect entries, three double-indirect entries, and three triple-indirect entries. The entries for the single-indirect entries indicate the locations in which an additional data location table of direct entries is stored. The entries for the double-indirect entries indicate the locations in which data location tables are stored wherein the data location tables include single-indirect entries. The entries for the triple-indirect entries indicate the locations in which data location tables are stored wherein the data location tables include double-indirect entries.

Because any block may be mirrored across any number of devices, the metadata data structure 510 is flexible enough to represent blocks with multiple locations and still provide the fast access that comes from direct indexing within a fixed space. Thus, a type may advantageously be associated with the metadata data structure 510 to indicate the type of data location table to be used. In one embodiment of the metadata data structure 510, there may be room for 24 data entries, such as, for example, 24 pointers.

Type 0 may be used when a data file is small; the data location addresses are stored as direct entries. Thus, a Type 0 metadata data structure includes 24 direct entries. Type 1 may be used to support larger files and mirror of up to two times (three copies of the file). Type 1 uses 15 direct entries, three single-indirect entries, three double-indirect entries, and three triple-indirect entries. Type 2 may be used to support mirroring of up to 7 times (8 copies of the file), and includes eight single-indirect entries, eight double-indirect entries, and eight triple-indirect entries. Type 3 data location tables enable even further mirroring as all of the disk addresses are stored as triple-indirect entries. As a result, up to 24 complete file copies may be stored.

It is recognized that a variety of data location tables may be used and that FIGS. 6A, 6B, 6C, and 6D illustrate sample embodiments. In other embodiments, for example, the data location tables may include a different mixture of direct and indirect entries. Further, in other embodiments, the data location tables may include a entry field which designates the type of entry for each entry in the table. The types may include, for example, those discussed above (e.g., direct, single-indirect, double-indirect, triple-indirect) as well as others (e.g., quadruple-indirect, etc.). In addition, the data location table may include deeper nesting of data location tables up to X levels wherein X is an integer.

1. Directory Metadata

FIG. 7A illustrates a sample set of metadata for the directory PASSWORDS. In FIG. 7A, the data structure stores information about the PASSWORDS directory. The directory is mirrored twice (three copies total). Because a directory structure is relatively small (e.g., it fits within a block), there are only three direct pointers used, one for each copy. The sample set of metadata includes a data location table 710 which includes direct entries 720 indicating the location of the data block using a device/block number pair as well as a set of unused block entries 730.

2. File Metadata

Figure 7B:
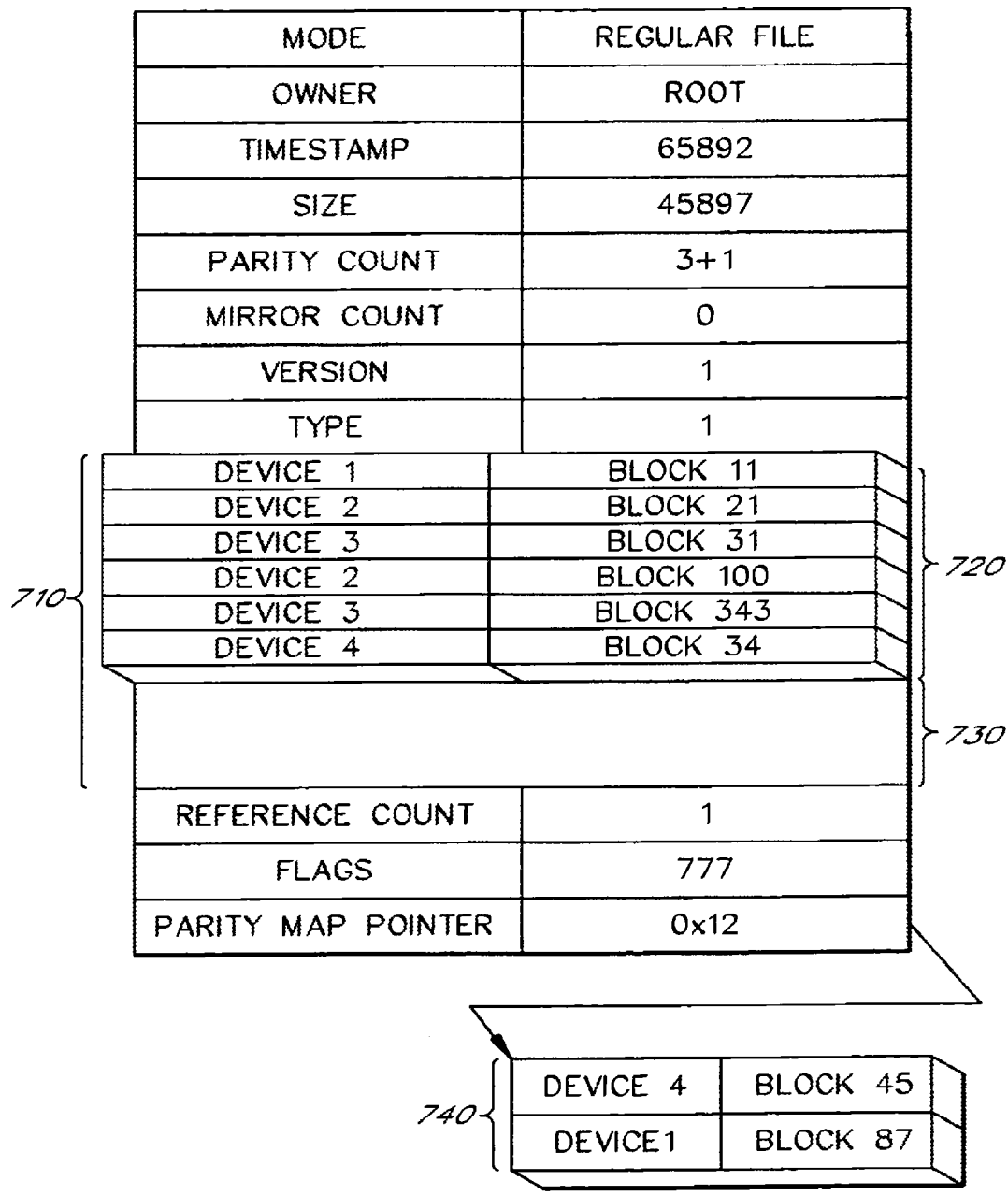
FIG. 7B illustrates one embodiment of a metadata data structure for a file.

FIG. 7B illustrates a sample set of metadata for the file USER.TXT. In FIG. 7B, the data structure stores information about the USER.TXT file. There is one copy of each of the data blocks for the USER.TXT file data and the data is protected using a 3+1 parity scheme. The content data for USER.TXT is of size 45 K and the block size is 8 K, thus, there are 6 blocks of data with the 6$^{th}$ block of data not fully used. The data location table 710 shows the location in which each of the 6 blocks of data are stored 720, wherein the blocks of data are referenced by device number and block number and where the first entry corresponds to the first block of data. Further, the location of the parity information for the content data is stored in a parity map 740 whose location is designated by the last location of the data structure as "parity map pointer." The USER.TXT file is stored using a 3+1 parity scheme thus, for every three blocks of data, a block of parity data is stored. Because there are six blocks in this 3+1 parity scheme, there are two blocks of parity data (6 divided by 3 and rounding up to the nearest integer). The parity map shows the location in which both of the blocks of parity data are stored, wherein the blocks of parity data are referenced by device number and block number and where the first entry corresponds to the first block of parity data.

B. Data Location Table Data Structures

The intelligent distributed file system 110 may provide storage for a wide variety of data files as well as flexibility as to how the data files are stored. Redundancy and mirroring of data files is performed at the file system level enabling the intelligent distributed file system 110 to support varying redundancy parameters for different files. For example, some directories may be mirrored, parity protected, or not protected at all.

Figure 8A:
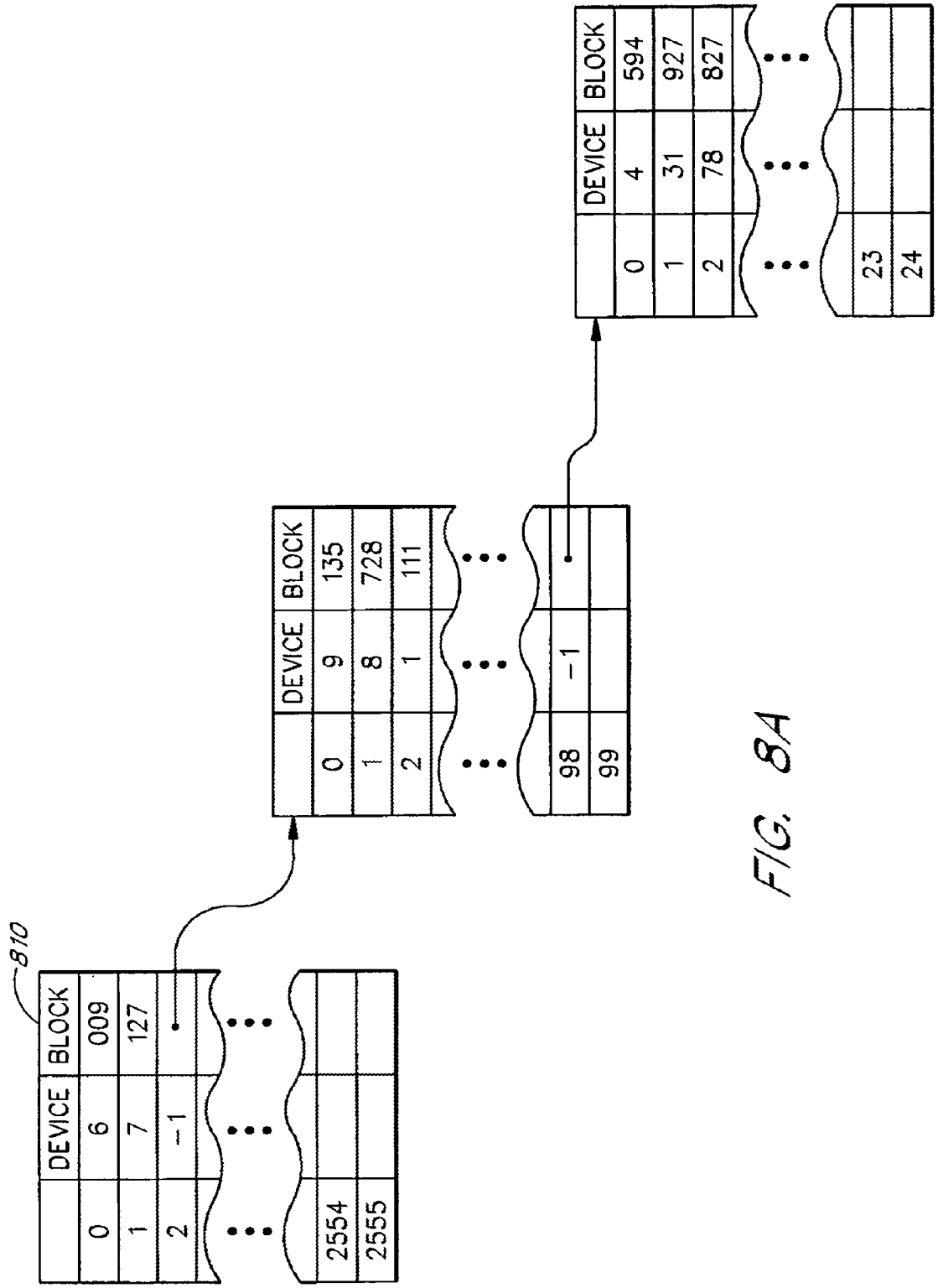
FIG. 8A illustrates one embodiment of a data location table.
Figure 8C:
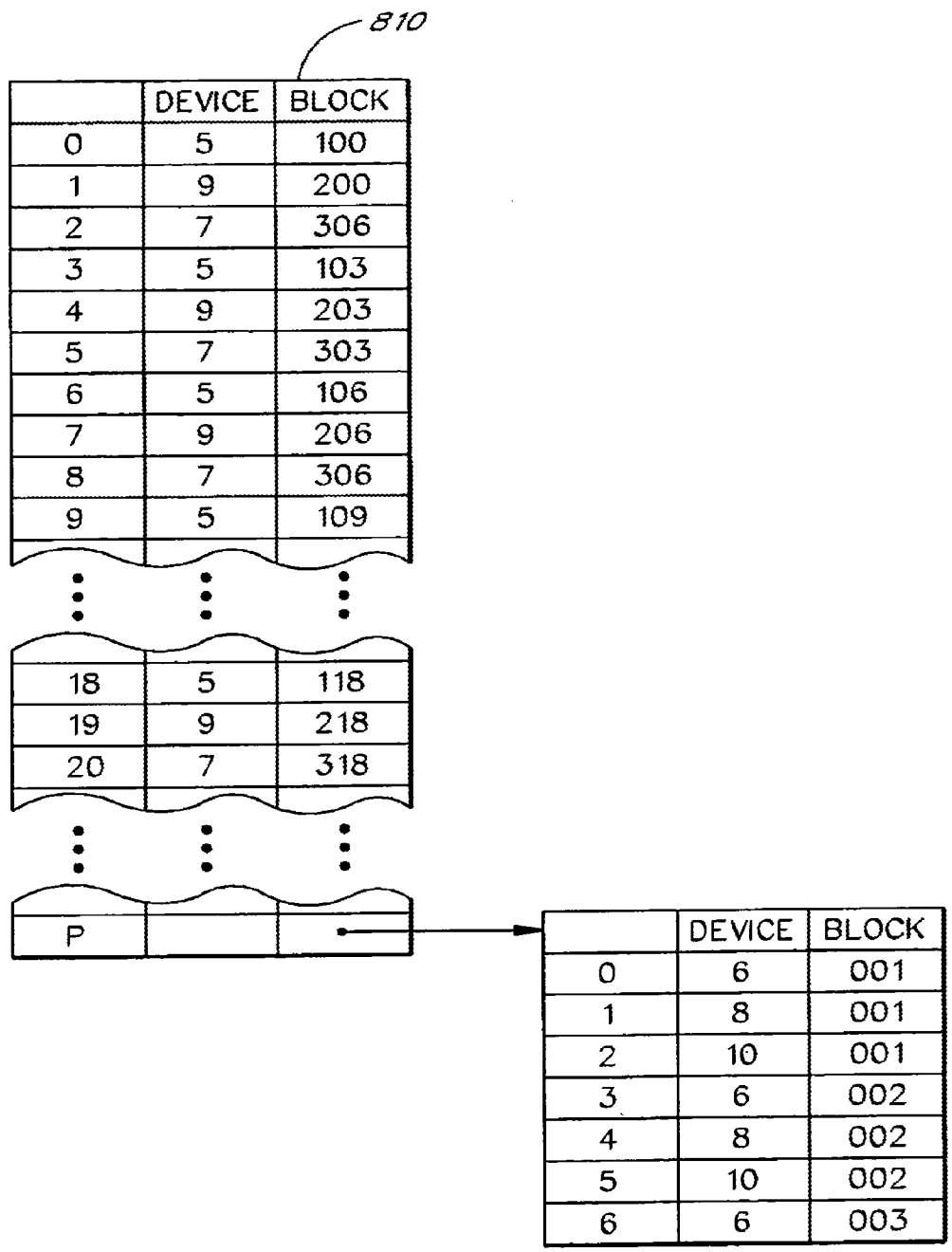
FIG. 8C illustrates an additional embodiment of a data location table.

FIGS. 8A, 8B, and 8C illustrate example data location tables that may be used to store data location information for data files of varying protection types and levels. FIGS. 8A, 8B, and 8C are meant to illustrate various data location tables, and it is recognized that a variety of different formats and/or structures may be used.

FIG. 8A illustrates a sample data location table 810 that indicates where each block of data of the corresponding file is stored. Note that the corresponding metadata for the file, such as that in FIG. 7B, is not shown, though it is recognized that the data location table 810 may correspond to a set of metadata. The exemplary data location table 810 includes both direct entries and indirect entries.

The direct entry includes a device ID/block pair. The device ID indicates the smart storage unit on which the data is stored, and the offset or block address indicates the location on the storage device where the data is stored. One sample entry in the data location table may be:

| Entry | Device | Block |
|-------|--------|-------|
| 1     | 7      | 27    | indicating that Block 1 of the data is stored on device number 7 at block 127.

The sample data location table 810 may also include indirect entries which point to additional data location tables enabling a data location table to track data locations for a larger set of data. While the level of indirect entries is theoretically unlimited, the levels may advantageously be limited so as to improve throughput rates. For example, the data location table may be limited to only allow at most double-indirect entries or at most triple-indirect entries. The exemplary data location table 810 illustrates two levels of indirect entries.

Further, the last entry of the data location table may be reserved to store the address of the parity map (if any). In other examples, the address of the parity map may be stored in other locations, such as, for example, as an entry in the metadata data structure. If a set of data does not include parity protection, the address value may be set to a standard value, such as NULL.

FIG. 8B illustrates a data location table for data that has been mirrored in two additional locations. The data location table includes a device ID and a block or offset address for each copy of the data. In the exemplary data location table, the mirrored locations have been selected on a block-by-block basis. It is recognized that other schemes may be used such as, for example, selecting one or more smart storage units to mirror specific smart storage units. While the data location table in FIG. 8B includes only direct entries, it is recognized that indirect entries may also be used.

In one embodiment, the mirroring information for a file may be stored in the file's corresponding metadata structure. This information may include, for example, number of copies of the data, as well as the locations of the data location table for each copy. It is recognized that the data location tables may be stored as a single data structure, and/or separate copies of the data location tables may be stored in different locations.

The sample data location table of FIG. 8B with mirrored data does not include parity protection though it is recognized that the data location table may include parity information.

FIG. 8C illustrates a data location table with a parity map. In the exemplary 15 data location table, the data is being protected using a 3+1 parity scheme, that is a set of parity data is being created from every three blocks of data. Techniques well known in the art for creating data may be used, such as, for example, by XORing the blocks of data together on a bit-by-bit, byte-by-byte, or block-by-block basis to create a parity block.

The exemplary data location table provides information about a data file that consists of 21 data blocks (block 0 to block 20). Because the parity scheme is 3+1, a parity block is created for each set of three data blocks. Table 2 illustrates the correspondence between some of the data blocks and some of the parity blocks shown in FIG. 8C.

TABLE 2

| Data Blocks | | | Parity Blocks |
|---|---|---|---|
| 0 | 1 | 2 | 0 |
| Device 5 | Device 9 | Device 7 | Device 0 |
| Block 100 | Block 200 | Block 306 | Block 001 |
| 3 | 4 | 5 | 1 |
| Device 5 | Device 9 | Device 7 | Device 8 |
| Block 103 | Block 203 | Block 303 | Block 001 |

The sample data location table includes a parity map or parity location table. In the exemplary parity map, there is a one to one mapping between the set of block entries used to create data and the parity map. In other embodiments, the parity map also includes variable size entries which specify which blocks, by device and block number, may be parity XORed together to regenerate the data, in the event that it is not available in any of its direct locations, due to device failure. In other embodiments, the parity generation scheme is pre-set such that the location and correspondence of parity data may be determined by the intelligent distributed file system 110 without specifying the blocks which should be XORed together to regenerate data.

In one embodiment, the parity map is pointed to by the metadata data structure, such as, for example, in the last entry of the metadata data structure, rather than included in the metadata data structure. This map may be pointed to, instead of included directly in the metadata structure because its usage may only be required in the uncommon case of a failed smart storage unit 114.

The parity map may also use variable sized entries to express the parity recombine blocks enabling the smart storage unit 114 to traverse the parity map a single time while rebuilding the data and to parse the parity map as it is traversed. In some situations, the compute and I/O time to retrieve and parse an entry is negligible compared to the parity compute time.

The sample data location table 810 of FIG. 8C with parity location information does not include mirroring information or indirect entries, though it is recognized that one or both may be used in conjunction with the parity location information. Further, it is recognized that other data structures may be used and that the data location table data structure is meant to only illustrate one embodiment of the invention.

C. Sample Data

Figure 9:
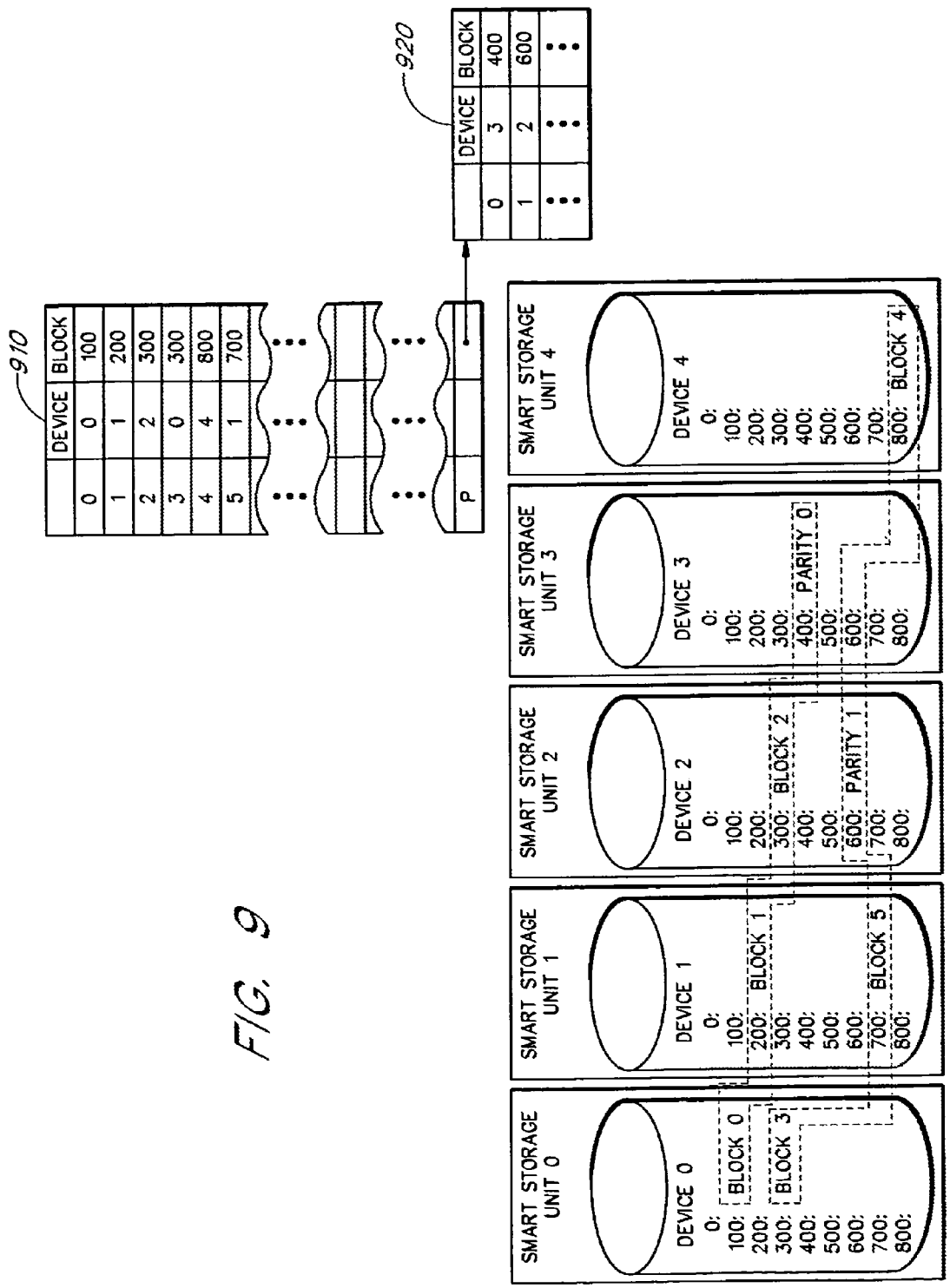
FIG. 9 illustrates a sample metadata data structure of a file with corresponding sample data.

FIG. 9 illustrates a sample data location table 910 and parity map 920 and the corresponding devices on which the data is stored. The example of FIG. 9 shows how data may be stored in varying locations on the devices, that the "stripes" of data are stored across different offset addresses on each device, and that the parity data may be stored in various devices, even for data from the same file. In other embodiments, the data may be stored at the same offset address on each device.

For example, the parity data for the first stripe is stored on device 3 at location 400 and relates to data block 0 stored on device 0 at location 100, data block 1 stored on device 1 at location 200, and data block 2 stored on device 2 at location 300. The parity data for the second stripe is stored on device 2 at location 600 and relates to data block 3 stored on device 0 at location 300, data block 4 stored on device 4 at location 800, and data block 5 stored on device 1 at location 700.

In some embodiments, the individual device decides where and/or how to map the locations to the actual locations on disk. For example, if device 0 has 4 physical hard disks, and each hard disk has the storage capacity for 100 blocks, then device 0 would allow for storage to location 0 to location 399. One sample set of guidelines that may be used to determine how the location maps to the block on disk is as follows:

Disk number=floor of (location/number of blocks per disk)
Block on disk=location MOD number of blocks per disk.

Note that MOD is a modulus operator that takes the remainder of a division. It is understood that the guidelines above represent only a sample of the guidelines that may be used for mapping locations to disk and disk block, and that many other guidelines or schemes could be used. For example, one embodiment may utilize a linked list of block ranges representing each disk and conduct a list traversal. A linked list has the advantage of allowing for multiple sized disks.

Due to the flexibility of the storage of data and parity information, as new smart storage units are added, new data may be stored on the new smart storage units and/or existing data may be moved to the new smart storage units (e.g., by making a copy before deleting the data on the existing unit) without disrupting the system. In addition, data blocks or entire files may be moved or copied in real-time in response to high request volume, disk failure, changes in redundancy or parity parameters, and so forth.

VII. Intelligent Distributed File System Processes

A. Retrieving Data

Figure 10:
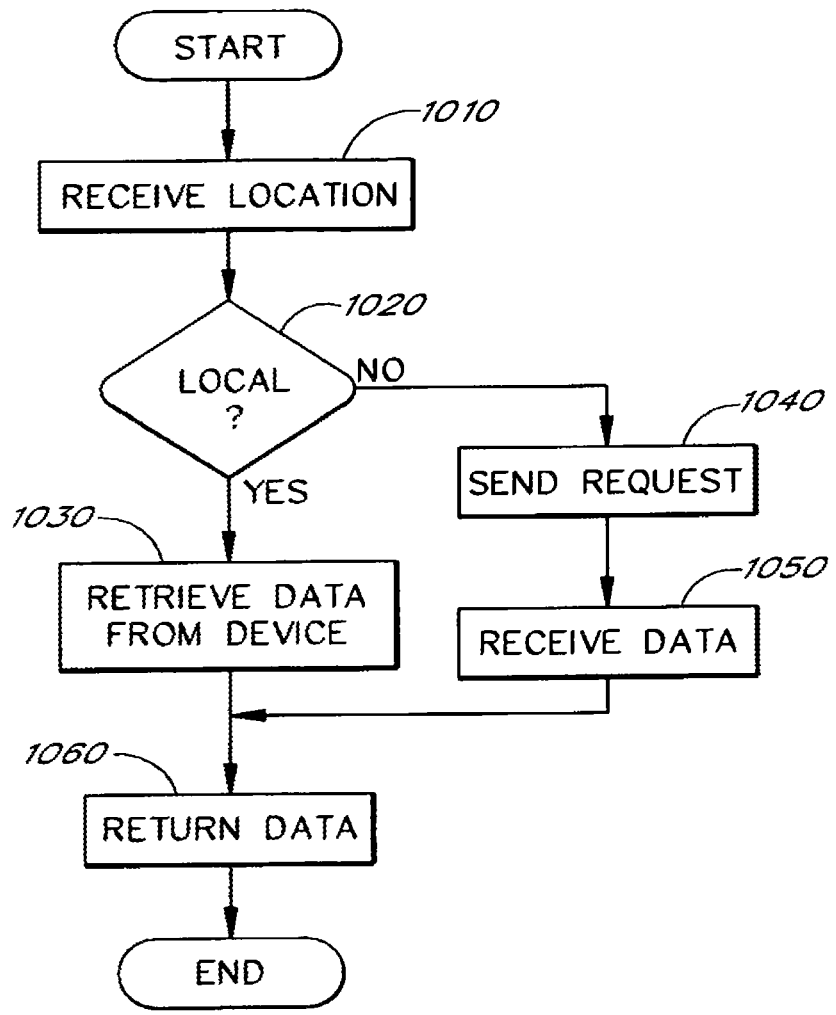
FIG. 10 illustrates one embodiment of a flow chart for retrieving data.

FIG. 10 illustrates one embodiment of a flow chart for retrieving data ("retrieve data process"). A variety of data types may be retrieved, such as, for example, directory metadata, file metadata, content data, and so forth.

Beginning at a start state, the retrieve data process receives the location at which the data is stored (block 1010). In one embodiment, the location may be designated using a smart storage unit ID and an offset or block address. In other embodiments, the storage device's ID may be used, whereas in other embodiments, a table may be used to map the IDs onto other IDs, and so forth.

Next, the retrieve data process determines whether the data is stored locally (block 1020). If the data is stored locally, then the retrieve data process retrieves the data from local storage (block 1030). In one embodiment, the retrieve data process may first check the cache and if the data is not there, then check the storage device. In other embodiments, the retrieve data process may check only the storage device.

If the data is not stored locally, then the retrieve data process sends a request for the data to the smart storage unit on which the data is stored (block 1040). In one embodiment, the request is sent via the switch component 125 shown in FIG. 1. The receive data process then receives the requested data (block 1050).

The retrieve data process collects the data that has been requested and returns the data (block 1060). In some embodiments, the data is returned after the entire set of data has been collected. In other embodiments, portions or sets of the data are returned as the data is retrieved form local storage or received from other smart storage units. The portions may be return in sequential order according to the file location table or they may be returned as they are retrieved or received. After the data has been returned, the retrieve data process proceeds to an end state.

It is recognized that FIG. 10 illustrates one embodiment of a retrieve data process and that other embodiments may be used. In another example, more than one retrieve data process may be used at the same time such that data is being retrieved by multiple retrieve data processes in parallel using techniques or combination of techniques, such as, for example, parallel processing, pipelining, or asynchronous I/O.

B. Processing Name Lookups

Figure 11:
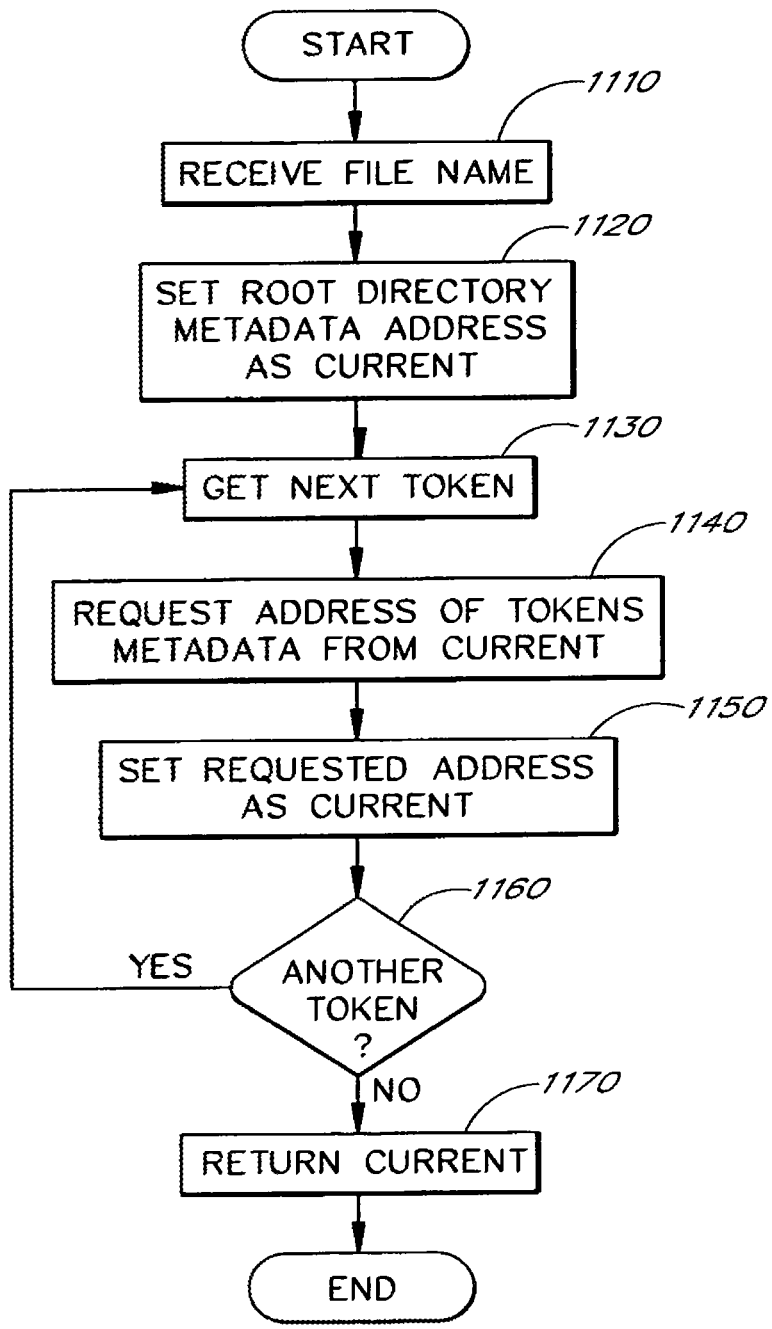
FIG. 11 illustrates one embodiment of a flow chart for performing name resolution.

FIG. 11 illustrates one embodiment of a process for name lookups ("name lookup process"). Beginning at a start state, the name lookup process receives a file name (block 1110), retrieves the root directory's metadata, and sets the location of the root metadata as CURRENT (block 1120). In one embodiment, the root directory's data may be stored in a data structure, such as the data structure of FIG. 5, though it is recognized that a variety of data structures may be used to store the root directory's metadata. Furthermore, in some embodiments, the root directory's metadata may be stored with each smart storage unit 114 such that each smart storage unit 114 has the same or a similar copy of the root directory's metadata. In other embodiments, the root directory's metadata may be stored in other locations in the intelligent distributed file system 110 or sent to the smart storage units 114 with a file request. It is recognized that well known techniques for ensuring the integrity of multiple copies of the data may be used, such as, for example, locking via mutexes and/or semaphores, and so forth.

The name lookup process may then retrieve the next token that is part of the file's name (block 1130). The name lookup process then requests the address of the location of the token's metadata from the smart storage unit 114 which stores the data for CURRENT (block 1140). This request may be local or remote. The name lookup process may then set the returned address as CURRENT (block 1150) and determine whether there is another token (block 1160), where a token represents a single level in a directory hierarchy. If there is another token, the name lookup process returns to block 1130. If there are no more tokens, the name lookup process returns the value of or a reference to CURRENT (block 1170) and proceeds to an end state.

It is recognized that other implementations of a name lookup process may be used. For example, the name lookup process may retrieve the file's metadata data. In addition, once the location of the requested data is found, the name lookup process may determine whether the data is stored locally or with other smart storage units. If the data is stored locally, the name lookup process may send a READ request to the local block manager module 335 of the smart storage unit 114; if the data is stored on another smart storage unit, the name lookup process may send the READ request to the remote block manager module 337 of the remote smart storage unit 114.

C. Processing a File Request

Figure 12:
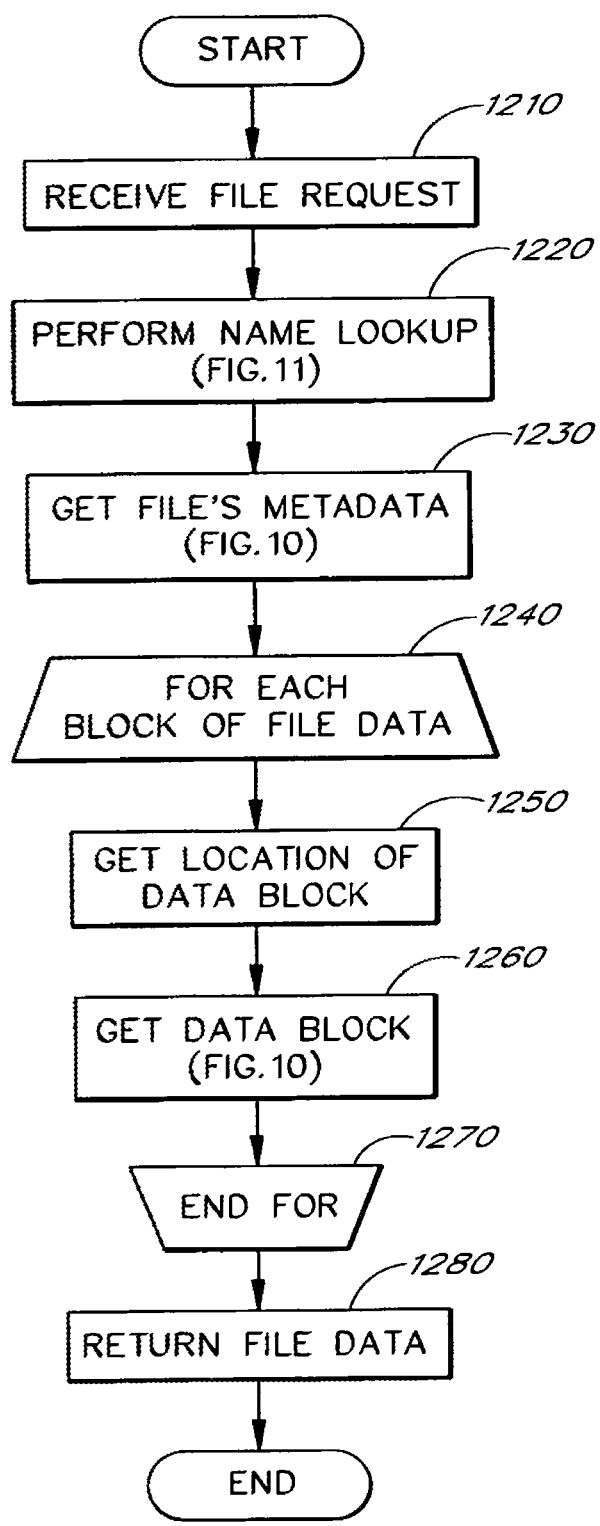
FIG. 12 illustrates one embodiment of a flow chart for retrieving a file.

FIG. 12 illustrates one embodiment of a flow chart for processing a file request ("file request process"). Beginning at a start state, the file request process receives a request to retrieve a file (block 1210). In one embodiment, the file is designated using the file's full path name, including location and file name. In other embodiments, the path may be a relative path and/or other data structures, such as tables, may be used to store information about the file's address. Next, the file request process performs a name lookup process, such as that illustrated in FIG. 11 (block 1220), to determine the location of the file's metadata data structure.

The file request process may then retrieve the file's metadata (block 1230) using a retrieve file process such as that shown in FIG. 10 and discussed above, though other retrieve file processes may be used. In one embodiment, the file's metadata may include a data location table that provides access to the locations in which each block of data in the file is stored throughout the intelligent distributed file system.

Then, for each block of data in the file (blocks 1240, 1270), the file request process obtains the location of the data block (block 1250) by looking it up in the file's metadata and retrieves the data block (block 1260) using a retrieve file process such as that shown in FIG. 10 and discussed above, though other retrieve file processes may be used.

The file request process then returns the file's data (block 1280) and proceeds to an end state. In some embodiments, the file is returned after the entire set of data has been collected. In other embodiments, one or more blocks of data may be returned as the data is retrieved. The portions may be return in sequential order according to the file location table or they may be returned as they are retrieved or received. In one embodiment, the file request process may put the data blocks in order and/or other modules, such as a streaming server may order the data blocks. After the data has been returned, the retrieve data process proceeds to an end state.

It is recognized that FIG. 12 illustrates one embodiment of a file request process and that other embodiments may be used. For example, the file request process may determine the file's location using a different name lookup process than that shown in FIG. 11. In another example, more than one retrieve data process may be used at the same time to retrieve the data blocks enabling the data to be retrieved by multiple retrieve data processes in parallel using techniques or a combination of techniques, such as, for example, parallel processing, pipelining, or asynchronous I/O.

D. Parity Generation Process

Figure 13:
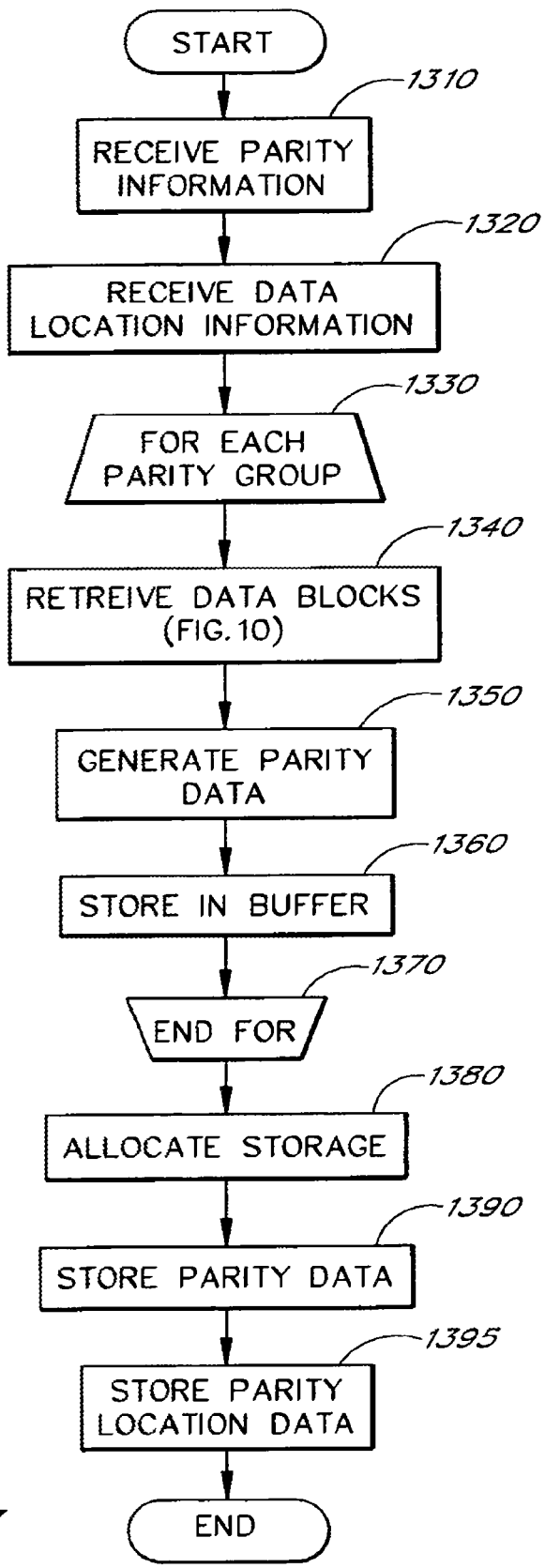
FIG. 13 illustrates one embodiment of a flow chart for creating parity information.

FIG. 13 illustrates one embodiment of a flow chart for generating parity information ("parity generation process"). Beginning at a start state, the parity generation process receives parity scheme information related to a set of data (block 1310). The set of data may represent file data, file metadata, directory metadata, a subset of file data, and so forth. The parity generation process receives data location information related to the set of data (block 1320). Next, for each set of parity data (block 1330, 1370), the parity generation process retrieves a set of data (block 1340). For example, if the parity is 3+1, the parity generation process retrieves the first three blocks of data using a data retrieve process such as that shown in FIG. 10. Next, the parity generation process generates the parity data for the set of data (block 1350), such as, performing an XOR operation of the data on a bit-by-bit, byte-by-byte, or block-by-block basis. The parity generation process may then store the data in a buffer and return to block 1330 until the parity information for the set of data has been generated. After the parity information has been generated, the parity generation process determines where to store the parity data (block 1380). The parity generation process may use a rotating parity scheme, wherein each parity block for each successive strip of file data is stored on the next device in the rotation. The parity generation process allocates the parity block on a different device than any of the devices which are holding data for the current stripe to ensure in the event of a device failure that parity information is not lost at the same time as data information. The parity generation process may also take into account other factors, such as storage capacity, CPU utilization, and network utilization to eliminate some devices from being considered for parity storage. The parity generation process then stores the buffered data in the allocated space (block 1390), records the location of the parity data in a parity map (block 1395), and returns to an end state.

It is recognized that FIG. 13 illustrates one embodiment of a parity generation process and that other embodiments may be used. For example, the parity generation may retrieve blocks of data in parallel and generate parity information in parallel or using well known pipelining or asynchronous I/O techniques. Further, the parity generation process may store the parity information and the location of the parity information without writing to a temporary buffer or the parity generation process may return the parity data or a pointer to the parity data.

E. Data Recovery Process

Figure 14:
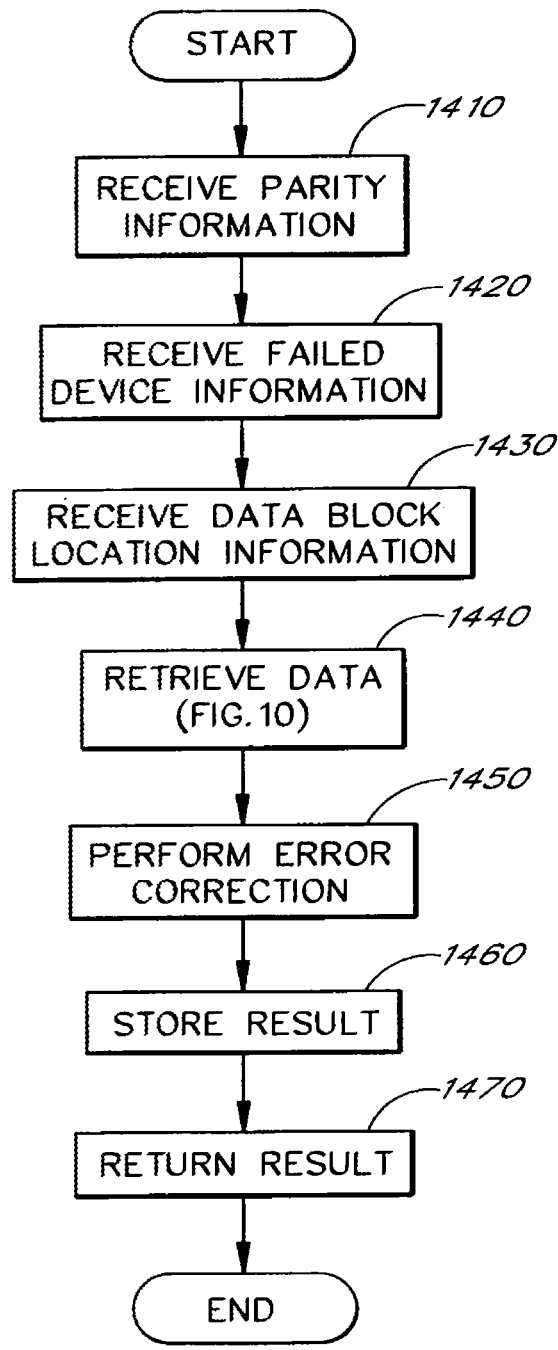
FIG. 14 illustrates one embodiment of a flow chart for performing error correction.

FIG. 14 illustrates one embodiment of a flow chart for recovering lost or corrupt data ("data recovery process"). Beginning at a start state, the data recovery process receives information regarding the parity scheme used (block 1410). The data recovery process then receives information about the failed or corrupt disk or data (block 1420). Next, the data recovery process receives address information for the parity block group in which the missing or corrupt data is assigned (block 1430). The data recovery process then retrieves the data blocks from the available smart storage units (block 1440). The data may be retrieved using a retrieve data process such as that of FIG. 10. The data recovery process performs error correction (block 1450), such as XORing the blocks according to the parity scheme and stores the result in a buffer (block 1460). The data in the buffer represents the missing data. The data recovery process may then return the data in the buffer (block 1470) and proceeds to an end state.

It is recognized that FIG. 14 illustrates one embodiment of a data recovery process and that other embodiments may be used. For example, the data recovery process may return the restored data without storing it.

VIII. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A distributed file storage system comprising:
   a plurality of storage units that communicate over a network, wherein each storage unit includes at least a processor and a storage device;
   a file stored on one of the plurality of the storage units;
   a switch that is configured to receive a read request for the file and to send the read request to one of the plurality of storage units that stores at least the file or a replicated copy of the file, wherein each of the plurality of storage units is operable to monitor access to the file, such that a block cache module is operable to perform a scaled amount of packet read aheads, and wherein the scaled amount is based on at least a current read rate and a current latency of a link to access the file;
   wherein the distributed file storage system is arranged for determining at least one copy of the file to be replicated and determining at least a portion of the plurality of storage units to separately store each replicated copy of the file, wherein monitoring is in real time for a pattern of access and based on the monitored pattern of access indicating a frequent access pattern, modifying storage of data blocks for the file by replicating the data blocks on multiple storage units that creates multiple points of access for at least one of the data blocks for the file; and
   wherein the distributed file storage system includes different levels of replication including different types and times of replications for different files.

2. The distributed file storage system of claim 1, wherein each of the plurality of storage units is further operable to monitor a latency to access each copy of the file, and content included in the file.

3. The distributed file storage system of claim 1, further comprises metadata stored on each storage unit is employable to process the read request for the file.

4. The distributed file storage system of claim 1, further comprises a plurality of replicated copies of metadata that are mirrored on at least a portion of the plurality of storage units, wherein the mirrored replicated copies of metadata are employable to process the read request for the file.

5. The distributed file storage system of claim 1, wherein at least one of the plurality of storage units is operable to store at least a data block of the file based on at least one of a size of the file, an importance of the file, an anticipated access rate of the file, available storage capacity at the at least one storage unit, the processor utilization at the at least one storage unit, and utilization of the network by each storage unit.

6. A storage unit for a distributed file storage system, comprising:
   a storage device;
   an interface for communicating with a plurality of storage units and a switch over a network;
   a file that is stored on the storage unit and at least one replicated copy of the file is stored on at least one of the other storage units; and
   a processor that is operable to execute instructions that enable actions, including:
      enabling the distributed file storage system to include different levels of replication including different types and times of replications for different files;
      enabling a switch to receive a read request for the file and to send the read request to at least one of the plurality of storage units that stores at least one of the file or a replicated copy of the file, wherein each of the plurality of storage units is operable to monitor access to the file, such that a block cache module is operable to perform a scaled amount of packet read aheads, wherein the scaling of the amount is based on at least a current read rate and a current latency of a link to access the file;
      enabling the distributed file storage system to determine at least one copy of the file to be replicated and to determine at least a portion of the plurality of storage units to store each replicated copy of the file; and
      wherein the monitoring of access to the file further comprises monitoring in real time a pattern of access; and based on the monitored pattern of access indicating a frequent access pattern, modifying storage of data blocks for the file by replicating the data blocks on multiple storage units that creates multiple points of access for at least one of the data blocks for the file.

7. The storage unit of claim 6, wherein each of the plurality of storage units is further operable to monitor a latency to access each copy of the file, and content included in the file.

8. The storage unit of claim 6, further comprises metadata stored on each storage unit is employable to process the read request for the file.

9. The storage unit of claim 6, further comprises a plurality of replicated copies of metadata that are mirrored on at least a portion of the plurality of storage units, wherein the mirrored replicated copies of metadata are employable to process the read request for the file.

10. The storage unit of claim 6, wherein at least one of the plurality of storage units is operable to store at least a data block of the file based on at least one of a size of the file, an importance of the file, an anticipated access rate of the file, available storage capacity at the one storage unit, the processor utilization at the at least one storage unit, and utilization of the network by the plurality of storage units.

11. A processor readable storage media that includes processor readable instructions for enabling actions for a distributed file system to operate over a network, comprising:
enabling communication between a switch and a plurality of storage units;
enabling the distributed file system to include different levels of replication including different types and times of replications for different files;
storing a file on at least one of the plurality of storage units and a replicated copy of the file on at least one of the other storage units;
enabling a read request for the at least one file to be provided by the switch to one of the storage units, wherein each of the plurality of storage units is operable to monitor access to the file, such that a block cache module is operable to perform a scaled amount of packet read aheads, and wherein the scaled amount is based on at least a current read rate and a current latency of a link to access the file;
determining a number of copies of the file to be replicated and determining at least a portion of the plurality of storage units to store each replicated copy of the file; and
wherein the monitoring of access to the file further comprises monitoring in real time a pattern of access; and based on the monitored pattern of access indicating a frequent access pattern, modifying storage of data blocks for the file by replicating the data blocks on multiple storage units that creates multiple points of access for at least one of the data blocks for the file.

12. The processor readable storage media of claim 11, wherein each of the plurality of storage units is further operable to monitor a latency to access each copy of the file, and content included in the file.

13. The processor readable storage media of claim 11, further comprises metadata stored on each storage unit that is employable to process the read request for the file.

14. The processor readable storage media of claim 11, further comprises a plurality of replicated copies of metadata that are mirrored on at least a portion of the plurality of storage units, wherein the mirrored replicated copies of metadata are employable to process the read request for the file.

15. The processor readable storage media of claim 11, wherein at least one of the plurality of storage units is operable to store at least a data block of the file based on at least one of a size of the file, an importance of the file, an anticipated access rate of the file, available storage capacity at the at least one storage unit, the processor utilization at the at least one storage unit, and utilization of the network by the plurality of storage units.

16. A method for enabling actions for a distributed file system to operate over a network, comprising:
enabling communication between a switch and a plurality of storage units;
enabling the distributed file system to include different levels of replication including different types of replications for different files;
storing a file on at least one of the plurality of storage units and a replicated copy of the file on at least one of the other storage units;
enabling a read request for the at least one file to be provided by the switch to one of the storage units, wherein each of the plurality of storage units is operable to monitor access to the file, such that a block cache module is operable to perform a scaled amount of packet read aheads, and wherein the scaled amount is based on at least a current read rate and a current latency of a link to access the file;
determining a number of copies of the file to be replicated and determining at least a portion of the plurality of storage units to store each replicated copy of the file; and
wherein the monitoring of access to the file further comprises monitoring in real time a pattern of access; and based on the monitored pattern of access indicating a frequent access pattern, modifying storage of data blocks for the file by replicating the data blocks on multiple storage units that creates multiple points of access for at least one of the data blocks for the file.

17. The method of claim 16, wherein at least one of the plurality of storage units is operable to store at least a data block of the file based on at least one of a size of the file, an importance of the file, an anticipated access rate of the file, available storage capacity at the at least one storage unit, the processor utilization at the at least one storage unit, and utilization of the network by the plurality of storage units.

18. The method of claim 16, wherein each of the plurality of storage units is further operable to monitor a latency to access each copy of the file, and content included in the file.

19. The method of claim 16, further comprises metadata stored on each storage unit that is employable to process the read request for the file.

20. The method of claim 16, further comprises a plurality of replicated copies of metadata that are mirrored on at least a portion of the plurality of storage units, wherein the mirrored replicated copies of metadata are employable to process the read request for the file.

* * * * *